(12) United States Patent
Jha et al.

(10) Patent No.: US 9,959,198 B1
(45) Date of Patent: May 1, 2018

(54) SIMULATED TESTING OF API

(71) Applicant: Google LLC, Mountain View, CA (US)

(72) Inventors: Prabhat Jha, San Jose, CA (US); Scott Ganyo, Santa Clarita, CA (US); Mohsen Azimi, San Francisco, CA (US); Ed Anuff, San Francisco, CA (US); A. Marsh Gardiner, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/166,169

(22) Filed: May 26, 2016

(51) Int. Cl.
*G06F 11/36* (2006.01)
*G06F 9/45* (2006.01)

(52) U.S. Cl.
CPC ...... *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 9,679,090 | B1* | 6/2017 | Marolia | G06F 3/01 |
| 2005/0080608 | A1* | 4/2005 | Burns | G06F 17/5009 |
| | | | | 703/22 |
| 2007/0277158 | A1* | 11/2007 | Li | G06F 8/24 |
| | | | | 717/135 |
| 2013/0040729 | A1* | 2/2013 | Griffin | G06Q 30/00 |
| | | | | 463/25 |
| 2015/0212931 | A1* | 7/2015 | Hong | H04L 43/50 |
| | | | | 714/38.1 |
| 2016/0124742 | A1* | 5/2016 | Rangasamy | H04L 47/70 |
| | | | | 717/103 |
| 2016/0179657 | A1* | 6/2016 | Jordan | H04L 41/0266 |
| | | | | 717/127 |
| 2017/0046253 | A1* | 2/2017 | Ganda | G06F 11/3688 |

\* cited by examiner

*Primary Examiner* — Daxin Wu
(74) *Attorney, Agent, or Firm* — Fish & Richardson P.C.

(57) ABSTRACT

A definition for the API is received. A request and response model is built for each defined operation of the API resource using the received definition. A simulated response for each defined operation of the API resource is generated in an API development environment according to the request and response model.

19 Claims, 18 Drawing Sheets

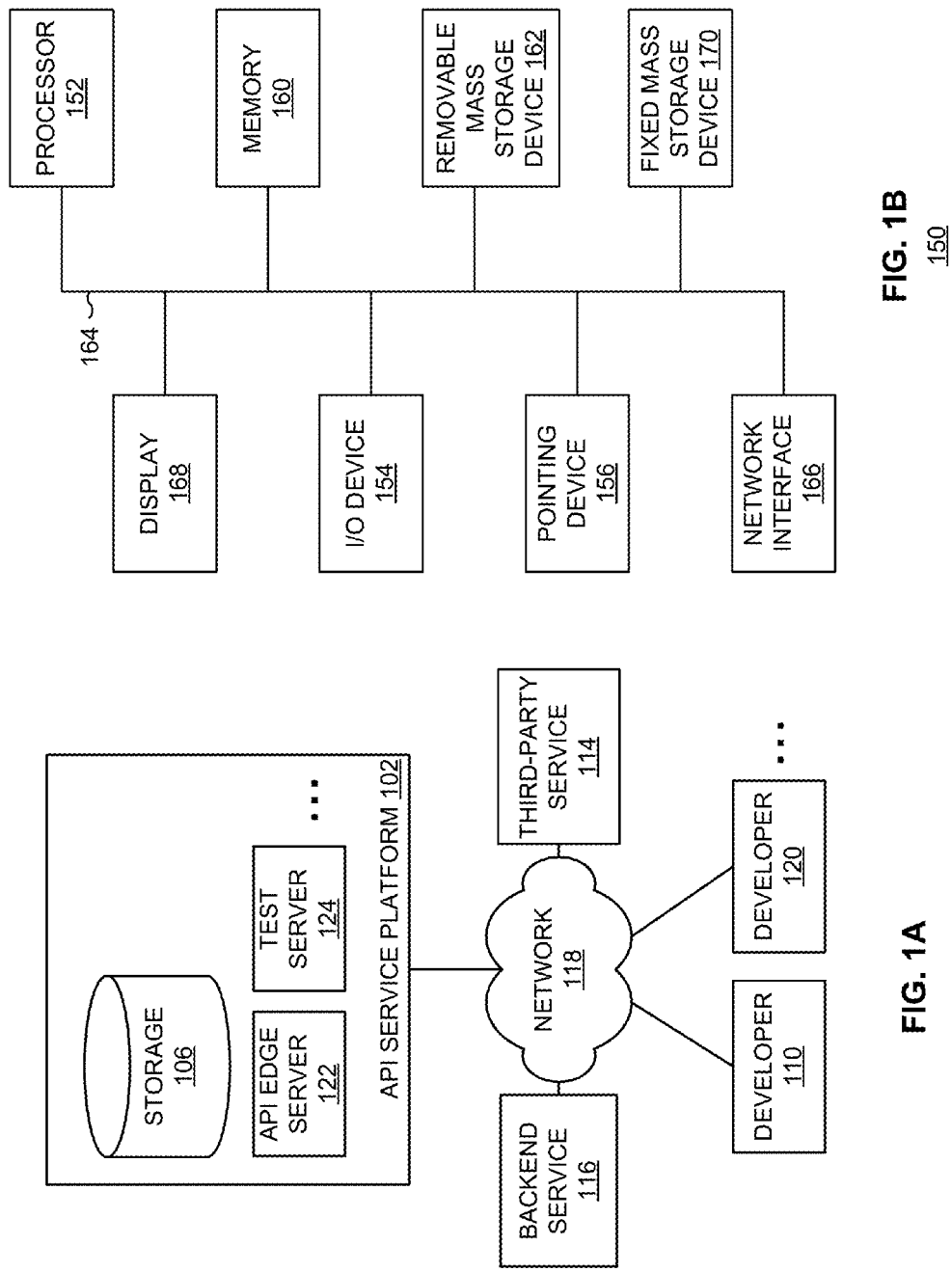

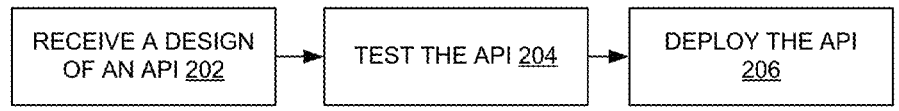

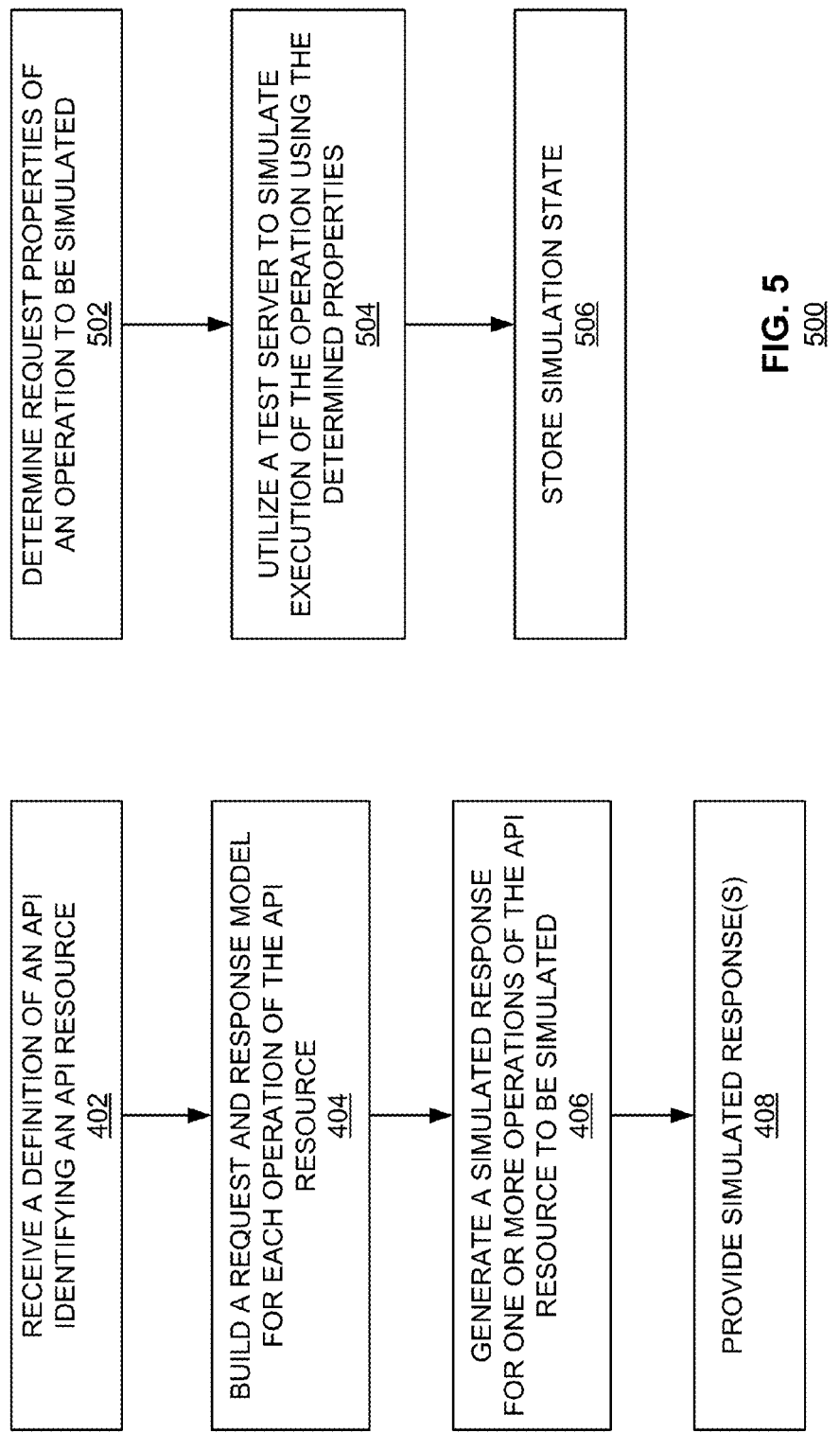

600

630

650

1200

SIMULATED TESTING OF API

BACKGROUND

An application programming interface (API) allows a developer to expose content or services to internal or external audiences. For example, to access data and services of a backend server, a user device makes requests using an API call and the desired data/services are provided in response. A typical API development process includes a design phase in which an API is defined, a test phase in which design features are tested, and a deployment phase in which the API is finalized and made available to users. It is often difficult for a developer to test the design of the API before the API is fully implemented. That is, the developer must first design the definition/specification of the API, then code its implementation before being able to manually deploy the API to a live server for testing. If the design of the API is discovered to be incorrect after testing, the developer must go back and not only modify the definition of the API, but must modify the implementation code. Discovery of the error earlier in the development would lead to a more efficient development process. Thus, there is a need for a more efficient API development and testing environment.

BRIEF DESCRIPTION OF THE DRAWINGS

Various embodiments of the disclosure are disclosed in the following detailed description and the accompanying drawings.

FIG. 1A is a block diagram illustrating an embodiment of a system for developing and testing APIs.

FIG. 1B is a functional diagram illustrating a programmed computer system for implementing an API development environment in accordance with some embodiments.

FIG. 2 is a flowchart illustrating an embodiment of a process for developing an API.

FIG. 3 is an example graphical user interface (GUI) of an API development environment.

FIG. 4 is a flowchart illustrating an embodiment of a process for simulating an API response.

FIG. 5 is a flowchart illustrating an embodiment of a process for generating a simulated response to an operation of an API resource.

DETAILED DESCRIPTION

Figure 6A:
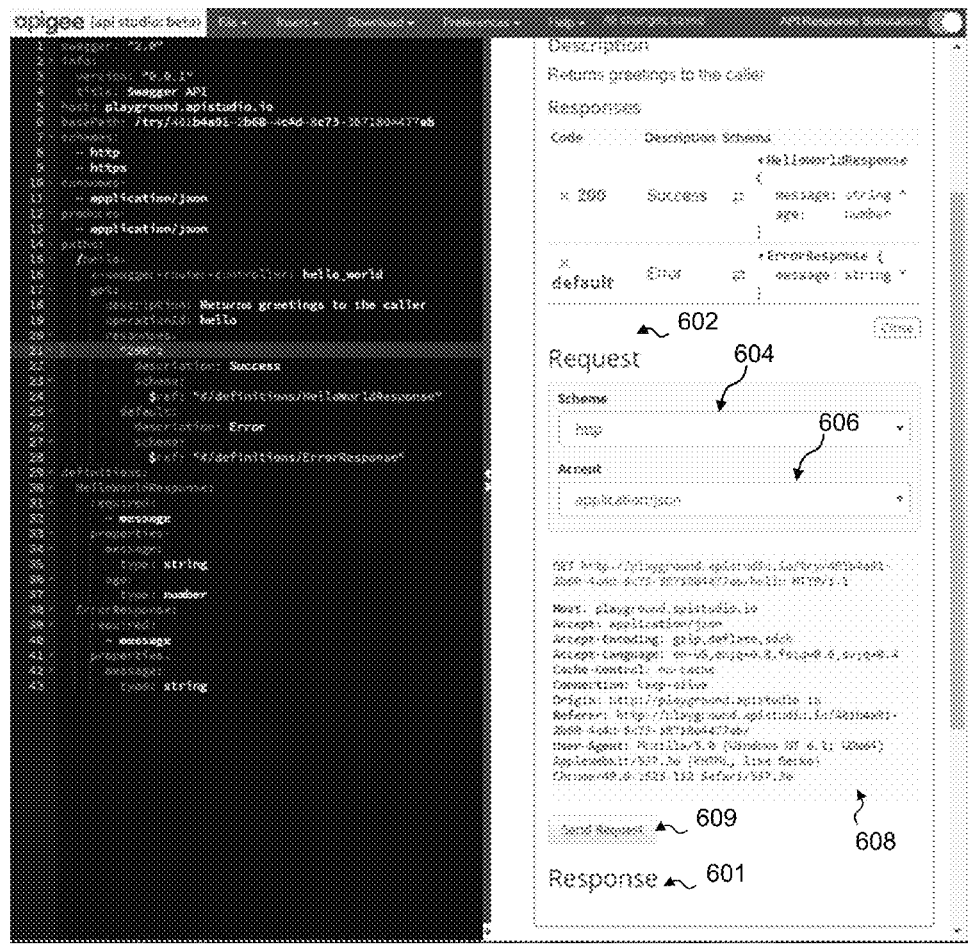
FIG. 6A is an example of a GUI for an API development and testing environment.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

A typical application programming interface (API) development process involves a delay between design, test, and deployment phases. This is because while conventional techniques allow a developer to design an API and see changes made to the API, they do not allow immediate testing of the developed features such as making an API call before a deployment server has been manually deployed and implementation code (e.g., controller logic) has been implemented. In particular, in order to test the API, a developer must write and deploy controller logic and deploy a test server. This requires time investment in developing API implementation code before the design (e.g., specification/definition/schema) of the API has been tested and finalized. Additionally, testing the API traditionally requires the developer to manually deploy a server for testing purposes.

In some embodiments, an API specification/definition authoring experience is integrated with simulation of its API implementation. For example, in order to test an API definition being developed, the developer is able to automatically simulate a mock response returned from a call to the API being developed without requiring the developer to actually implement the implementation/control logic of the API or manually deploy a test server. In some embodiments, by allowing the API to be simulated using an API specification, a client application that will utilize the API is allowed to be developed in parallel with the API implementation development. For example, before the server implementation code of the API has been completed and deployed, the client application is allowed to query a test server that returns simulated responses to API calls.

In some embodiments, developers interact with the API definition using a graphical user interface (GUI) that indicates simulated API responses. For example, the techniques described herein provide an API development environment in which a response is simulated for defined operations of an API resource. The API development environment can include an interactive design editor allowing users to design and simulate API definitions/specifications. In various embodiments, an editing, coding, and/or development experience is accompanied by simulation on the fly. In various embodiments, live editing of API definition/code is provided by allowing for the development and simulation experiences to be shared with other users. In various embodiments, development, testing, and simulation are provided within a development environment accessible using a Web browser. In some embodiments, APIs may be implemented in cooperation with various frameworks. For example, an API response can be created based on a model defined by the OpenAPI specification (also known as "Swagger"), which is a specification for machine-readable interface files for describing, producing, consuming, and visualizing Representational State Transfer (REST) Web services. With Swagger's declarative resource specification, clients can understand and consume services without knowledge of server implementation or access to the server code. In some embodiments, this resource specification (e.g., API definition/specification) can be tested while being developed by simulating the server code and server implementations to allow mock calls without requiring the developer to fully develop the server code.

FIG. 1A is a block diagram illustrating an embodiment of a system for developing and testing APIs. In some embodiments, the system provides an API development environment in which real-time updates and simulation based on edits are performed as further described herein. API service platform 102 is connected to backend service 116, one or more developers 110/120, and third-party service provider 114 via network 118. API service platform 102 includes storage 106, API edge server 122, and test server 124. The individual components of platform 102 may be networked together and/or directly connected to network 118.

Often, providers want to make their backend services available online for consumption by applications running on mobile devices and desktops. For example, an organization might want to expose its services that provide product pricing and availability information, sales and ordering services, order tracking services, and any other services required by client apps by exposing services as a set of Web endpoints. Client application developers may then make Web requests to these endpoints in developed application code. The client applications that consume these services can be implemented as standalone apps for a mobile device or tablet, as Web apps running in a browser, or as any other type of application that can make a request to a Web endpoint and consume any response data. These applications might be developed and released by the same organization that exposed the services or by third-party app developers who make use of publicly available services.

Developers also face challenges when trying to consume services from different providers. The same client application might use one mechanism to consume a service from one provider, and a different mechanism to consume a service from a different provider. Developers accommodate diverse mechanisms by securing and protecting services from unauthorized access. Security credentials are managed to ensure that credentials required to utilize services do not become compromised by unauthorized users. After a client application that accesses services has been released, a service provider maintains these services such that they continue to function over time as they add, modify, or delete those services. The service provider informs developers of changes to the services to enable client apps to stay in sync with those services.

In some embodiments, API service platform 102 enables secure access to backend service 116 via an API (e.g., a well-defined API that is consistent across services, regardless of service implementation) hosted by platform 102. For example, rather than having a client application (e.g., application of a user (not shown)) access backend service 116 directly, the client application accesses platform 102 that functions to map a publicly available Web endpoint via an API to backend service 116. Backend service 116 may include any service provider and/or content repository of an organization. In some embodiments, platform 102 acts as a proxy for content and/or a server provided by backend service 116. In some embodiments, developer(s) 110, 120 provides application code that will implement functionality of an API provided by platform 102 to access services of backend service 116. For example, a mobile application executed by a user (not shown) interacts with application code provided by developer(s) 110/120 (e.g., API implementing code provided by developer(s) 110/120) and implemented on platform 102 to access services of backend service 116. In some embodiments, backend service 116 is optional and application code provided by developer(s) 110/120 provides functionality without accessing backend service 116. In some embodiments, developer(s) 110/120 also programs a user application executed by the user (not shown) to access services of platform 102. For example, developer(s) 110/120 develops both a user application to be executed by the user and application code executed by platform 102 that interfaces with the user application to provide access to backend service 116. The application code (e.g., compiled program, uncompiled program, source code, script, API implementation code, etc.) provided by developer(s) 110/120 may be stored by platform 102. In systems having a plurality of developers, the developers can collaborate according to the techniques of the present disclosure to provide various functions to the user.

API service platform 102 provides its services using one or more API edge servers and/or one or more test servers that each handles requests. In some embodiments, the API service platform includes a plurality of edge servers. A plurality of API edge servers may assist fault tolerance, load balancing, and geographical distribution. For example, each request is routed to one of the API edge servers handling requests based on a current load of the servers and geographical proximity of the requester to a particular API edge server. In some embodiments, a developer generates an API in an API development environment of developer(s) 110/120. The behavior of the API can be simulated according to the techniques described herein.

Test server 124 hosts one or more APIs being tested. For example, as developers develop APIs, tools are provided to allow the developer to automatically deploy the API being developed to the test server for testing. In some embodiments, test server 124 hosts API simulation code to simulate responses to API definitions being tested. For example, when a developer desires to test a Swagger specification of an API before actually coding controllers (e.g., backend implementation code) for the API, tools are provided in a development environment to automatically deploy a simulation of the API on the test server to allow testing of an operation of the Swagger specification.

In some embodiments, an API edge server provides values for responses to API calls. For example, logic included in the API edge server(s) executes the API. API calls tested using the test server can also be tested or deployed using the API edge server. In some embodiments, enabling a simulation mode causes the test server to be used to respond to API calls and disabling the simulation mode causes the API edge server to be used to respond to API calls. The simulation described herein can be performed in the test server, the API edge server, or in both.

In some embodiments, platform 102 is able to handle security and authorization tasks to protect backend services, as well as to analyze, track, manage, monitor, and monetize the services. Because applications of developers make requests to platform 102, rather than directly to backend service 116, developers do not need to know the implementation details of backend service 116. Thus, platform 102 may allow isolation of developers from backend services. In some embodiments, policies on platform 102 are utilized to add functionality to a service without having to make any changes to the backend service. For example, policies may be added to perform data transformations and filtering, add security, execute conditional logic or custom code, and to perform many other actions. In another example, access may be revoked/modified so that a particular user application no longer has full access to the backend services. In another example, policies may be implemented to limit, track, and manage access to services. For example, an API product may be limited by a quota on the number of requests allowed. In this example, one API product may be made available with a low access limit, such as 1000 requests per day, for a low price, while another API product provides access to the same API services, but with a higher access limit, for a higher price. In some embodiments, platform 102 provides tools for adding and configuring APIs, applications, and related policies. In some embodiments, platform 102 is deployed within the computing environment of backend service 116. In some embodiments, platform 102 is deployed in the cloud (SaaS) where multiple entities may share platform 102.

In some embodiments, platform 102 provides API, analytics, and developer services such as providing an API development environment according to the techniques described herein. These services together may provide a comprehensive infrastructure for API creation, security, management, and operations (also referred to as "methods" and "functions"), as well as backend services for developing client applications. In some embodiments, API services provide API creation and utilization functionalities. Some examples are tools for adding and configuring APIs, setting up API products, and managing app developers and client apps according to the techniques described herein and/or other techniques. Policies may be implemented to add security, rate-limiting, mediation, caching, etc. Behaviors may be customized by applying custom scripts, making calls to third-party APIs and services, etc. In another example, a flexible data store and features such as social graphs, geolocation, user management, push notifications, performance monitoring, etc. are provided. In some embodiments, Java Node.js may be implemented to create APIs and API mashups. In some embodiments, analytics services provide tools to analyze short- and long-term usage trends of APIs. For example, audiences may be segmented by top developers and apps to understand usage by API methods to know where to invest, and create custom reports on business- or operational-level information and the like. In some embodiments, as data passes through platform 102, several types of information are collected including URL, IP, user ID for API call information, latency, error data, etc. Policies may be created to add other information, such as headers, query parameters, and portions of a request or response extracted from XML or JSON. In some embodiments, the information is collected asynchronously from the actual request/response flow and does not affect API performance. In some embodiments, developer services provide tools to manage a community of app developers using such services. Developer services may offer the flexibility to work with internal and external developers and formalize these relationships with financial models. In some embodiments, developer services are utilized to onboard developers and create a developer portal for publicly available API products. Application developers may connect to the portal to access API documentation, forums, blog entries, etc. In some embodiments, monetization capabilities provide financial infrastructure and relationships for digital assets. Monetization may allow a variety of rate plans that charge for the use of API products or through revenue-sharing. Monetization plans may include pre-paid plans, post-paid plans, fixed-fee plans, variable rate plans, "freemium" plans, etc. In some embodiments, platform 102 provides monetization reporting and billing services.

In some embodiments, storage 106 stores program code to be executed/implemented by platform 102. For example, one or more developers provide application code (e.g., code implementing one or more APIs) to be executed by platform 102. In some embodiments, application code provided by developer(s) 110/120, stored in storage 106, and/or executed by platform 102, may access third-party services provided by third-party service 114. For example, content is obtained from third-party service 114 that is controlled by an entity external to an entity of backend service 116, platform 102, and a user (not shown). In some embodiments, each request to platform 102 includes an API key that verifies access to the services of platform 102. The API key may be revoked and/or limited dynamically (e.g., limited in time, limited in count, limited in manner associated with a quota, etc.). In some embodiments, storage 106 stores changes made in the API development environment. For example, when a user makes a change in an interactive design editor such as the one shown in FIG. 3, changes are saved in storage 106. In some embodiments, storage 106 stores specifications/definitions/schema associated with requests and/or responses. For example, schema for a response (e.g., string, number) can be saved as an API definition in storage 106. The definition can be requested from the storage 106 in response to a query.

In some embodiments, program code provided by developer(s) 110/120 may need to access backend service 116 and/or third-party service 114 using one or more security credentials. For example, backend service 116 and/or third-party service 114 may require a valid username and password login to access its services. A variety of techniques may be used to prevent credentials from being exposed to vulnerabilities. By way of non-limiting example, credentials are stored in a credential store (not shown), each stored security credential is associated with a reference identifier that can be utilized to identify the specific credential, only computer code executing on platform 102 has access to obtain credentials stored in the credential store, the connection between platform 102 and the credential store is a physically secure connection, credentials stored in the credential store are encrypted, and the like.

The storage 106 may include one or more hardware and/or software interfaces to store and/or obtain data. Examples of storage 106 include a storage device, a secure storage, a server, a database, a distributed storage, a data structure, and any other type of storage or computing device. In some embodiments, any of the components of platform 102 may be included in the same device. In some embodiments, any of the components of platform 102 may represent a group of devices. Although one API edge server and one test server are shown, in various embodiments, any number of API edge servers and any number of test servers may exist.

Any of the components shown in FIG. 1A may represent one or more physical devices. For example, backend service 116, developer 110, developer 120, and third-party service 114 each represents a different computer device. Any of the components shown in FIG. 1A may be integrated together with one or more other components shown in FIG. 1A and/or a component not shown in FIG. 1A. For example, developer 110 and developer 120 may be integrated on the same physical device. Examples of the platform 102, backend service 116, third-party service 114, and developer(s) 110/120 include a server, a personal computer, a desktop computer, an electronic reader, a laptop computer, a storage, a smartphone, a tablet computer, a mobile device, a wearable device, a wearable computer, and any other computer or electronic device. Examples of network 118 include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1A may exist in various combinations of hardware machines. Other communication paths may exist and the example of FIG. 1A has been simplified to illustrate the example clearly. Although single instances of components have been shown to simplify the diagram, additional instances of any of the components shown in FIG. 1A may exist. Components not shown in FIG. 1A may also exist to perform and provide functions and services described herein.

FIG. 1B is a functional diagram illustrating a programmed computer system for an API development environment in accordance with some embodiments. For example, the computer system 150 can be included in API service platform 102 shown in FIG. 1A. As will be apparent, other computer system architectures and configurations can be used to perform the techniques described herein. Returning to FIG. 1B, computer system 150, which includes various subsystems as described below, includes at least one microprocessor subsystem (also referred to as a processor or a central processing unit (CPU) 152). For example, processor 152 can be implemented by a single-chip processor or by multiple processors. In some embodiments, processor 152 is a general purpose digital processor that controls the operation of the computer system 150. In some embodiments, processor 152 also includes one or more coprocessors or special purpose processors (e.g., a graphics processor, a network processor, etc.). Using instructions retrieved from memory 160, processor 152 controls the reception and manipulation of input data received on an input device (e.g., pointing device 156, I/O device interface 154), and the output and display of data on output devices (e.g., display 168). In some embodiments, processor 152 is used to perform the processes described herein with respect to FIGS. 2 and 4.

Processor 152 is coupled bi-directionally with memory 160, which can include, for example, one or more random access memories (RAM) and/or one or more read-only memories (ROM). As is well known in the art, memory 160 can be used as a general storage area, a temporary (e.g., scratch pad) memory, and/or a cache memory. Memory 160 can also be used to store input data and processed data, as well as to store programming instructions and data, in the form of data objects and text objects, in addition to other data and instructions for processes operating on processor 152. Also as is well known in the art, memory 160 typically includes basic operating instructions, program code, data, and objects used by the processor 152 to perform its functions (e.g., programmed instructions). For example, memory 160 can include any suitable computer readable storage media described below, depending on whether, for example, data access needs to be bi-directional or uni-directional. For example, processor 152 can also directly and very rapidly retrieve and store frequently needed data in a cache memory included in memory 160.

A removable mass storage device 162 provides additional data storage capacity for the computer system 150, and is optionally coupled either bi-directionally (read/write) or uni-directionally (read only) to processor 152. A fixed mass storage 170 can also, for example, provide additional data storage capacity. For example, storage devices 162 and/or 170 can include computer readable media such as magnetic tape, flash memory, PC-CARDS, portable mass storage devices such as hard drives (e.g., magnetic, optical, or solid state drives), holographic storage devices, and other storage devices. Mass storages 162 and/or 170 generally store additional programming instructions, data, and the like that typically are not in active use by the processor 152. It will be appreciated that the information retained within mass storages 162 and 170 can be incorporated, if needed, in standard fashion as part of memory 160 (e.g., RAM) as virtual memory.

In addition to providing processor 152 access to storage subsystems, bus 164 can be used to provide access to other subsystems and devices as well. As shown, these can include a display 168, a network interface 166, an input/output (I/O) device interface 154, a pointing device 156, as well as other subsystems and devices. For example, pointing device 156 can include or operate in conjunction with a camera, a scanner, etc.; I/O device interface 154 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 150. Multiple I/O device interfaces can be used in conjunction with computer system 150. The I/O device interface can include general and customized interfaces that allow the processor 152 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 166 allows processor 152 to be coupled to another computer, computer network, or telecommunications network using a network connection as shown. For example, through the network interface 166, the processor 152 can receive information (e.g., data objects or program instructions) from another network, or output information to another network in the course of performing process/process steps. Information, often represented as a sequence of instructions to be executed on a processor, can be received from and outputted to another network. An interface card or similar device and appropriate software implemented by (e.g., executed/performed on) processor 152 can be used to connect the computer system 150 to an external network and transfer data according to standard protocols. For example, various process embodiments disclosed herein can be executed on processor 152, or can be performed across a network such as the Internet, intranet networks, or local area networks, in conjunction with a remote processor that shares a portion of the processing. Additional mass storage devices (not shown) can also be connected to processor 152 through network interface 166.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1B is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 154 and display 168 share the touch sensitive screen component, which both detects user inputs and displays outputs to the user). In addition, bus 164 is illustrative of any interconnection scheme serving to link the subsystems. Other computer architectures having different configurations of subsystems can also be utilized.

The techniques described herein can be implemented by a processor such as processor 152 shown in FIG. 1B. The processor can be implemented as software components, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In this example, the ADC is implemented as a network device that manages network traffic and allows clients to request Web resources within an application delivery network.

FIG. 2 is a flowchart illustrating an embodiment of a process for developing an API. At least a portion of the process of FIG. 2 may be implemented on one or more components of API service platform 102 of FIG. 1A. For example, API design, simulation and deployment are achieved using one or more tools provided via one or more components of API service platform 102. In some embodiments, developer 110/120 of FIG. 1A interfaces with API service platform 102 to allow a developer to manage development, testing, and deployment of the API. The API design definition may be designed by developer 110/120 using an editor provided via API service platform 102 and this API definition may be tested/simulated in the development environment provided by API service platform 102.

At 202, a design of an API is received. In some embodiments, receiving the design includes receiving an API definition. The API definition defines how an underlying resource can be accessed. Examples of the API definition include a specification (e.g., Swagger specification), a schema, and other identification of one or more properties and/or capabilities of an API. The API definition may expose content and/or services (e.g., API resources) to internal or external audiences. The design of the API definition may be performed by a developer in a development environment. For example, using the development interface shown in FIG. 3, a developer creates, imports, and/or edits the API definition. In some embodiments, the received API definition is validated automatically and API documentation is automatically generated.

At 204, the API is tested. In some embodiments, testing the API includes verifying whether the API will function as desired, e.g., provide expected responses when an API call is made. In some embodiments, testing the API includes modeling the API definition of the API and simulating the API without requiring a developer to provide server implementation code of the API. For example, a simulated response to a call to an operation defined in the API definition is provided to a developer to allow the developer to test and verify the design of the operation. In some embodiments, a test server is automatically created to host a simulated version of the API that returns simulated/mock responses to a call to the API. Not only does this simplify testing of the design of the API definition, it allows parallel development of user applications that will be utilizing the API before the implementation code of the API has been fully developed. In some embodiments, the simulated responses help verify request formats and protocols to the API and response formats and protocols. In some embodiments, once implementation code of the API has been developed, testing the API includes allowing test calls to the API in non-simulation mode and providing responses processed using the developed implementation code. In some embodiments, the testing interface is provided via an API development interface that not only allows the API definition to be coded, but also provides a live interface for testing of the API definition in either simulated or non-simulated mode.

In some embodiments, once API definitions have been tested and finalized, implementation code templates (e.g., controller code templates) may be automatically generated. The implementation code templates may be at least partially built from developer interaction with the API development environment. The implementation code templates simplify and accelerate the development process by allowing developers to leverage code generated during simulation for later development phases. This can reduce the amount of code written to complete implementation. That is, development is streamlined and time can be saved by allowing for designs developed with a test server to be reused or modified after a user-implemented server is ready. For example, a Node.js project file, including templates to code resource operation controllers, can be automatically generated and provided to a developer to enable the developer to implement the API.

At 206, the API is deployed. In some embodiments, deploying the API includes allowing the API to be hosted on one or more servers that expose the API to one or more users. In some embodiments, the deployed API has been fully implemented. In some embodiments, the API has been deployed using the Node.js framework. For example, once the Swagger specification of the API has been defined and tested, code for controllers for operations of the API has been coded by a developer in the Node.js platform and deployed to one or more servers. The templates for the code of the controllers may have been automatically generated using a development platform that was used to test the API in 204. For example, the API development project is provided to a developer system as a Node.js project and controller functions are implemented in Node.js for the API. The controller implementation is deployed in a cloud-based Node.js platform and may be called from the API development environment by changing the basepath and host elements to point to the deployment. This disables the simulator and trying an API call returns a response from the deployed API.

FIG. 3 shows an example GUI of an API development environment. In some embodiments, GUI 300 is utilized by a developer to provide/develop an API definition in 202 of FIG. 2 and/or test the API definition in 204. GUI 300 includes a header (toolbar) 310 with menu elements 302-316, a definition panel 360, and a documentation panel 370. The definition panel 360 displays an API definition (e.g., Swagger specification) that has been specified by a developer. The API definition in definition panel 360 can be edited interactively. The documentation panel 370 is automatically generated from the content of definition panel 360. The documentation panel 370 shows an automatically generated API documentation describing the API definition in definition panel 360. For example, the documentation is an edited visualization of the API definition in a more human readable format. As an API definition is developed in the definition panel 360, the documentation in documentation panel 370 is automatically and dynamically updated to reflect any changes to the API definition.

The header 310 shows example menus 302-312. Other menus are also possible. The menus can be expanded or collapsed by selecting the corresponding graphical element (an arrow in this example). In the example shown, the menus include file, insert, download, preferences, and help. Each of these menus are further described herein, e.g., with respect to FIGS. 6-10.

The header 310 includes a status indicator 314. Status indicator 314 provides information about a processing status of the API development environment. In the example shown, the status is "all changes saved," indicating that changes have been saved to storage, e.g., storage 106 shown in FIG. 1A. Of course, other statuses are possible. For example, during modification of the API development environment (e.g., of panel 360 or 370), the status can be "processing," "processed with error," "processed with no error," etc.

The header 310 includes a simulation mode switch 316. In the example of FIG. 3, the simulation mode switch 316 is shown as a toggle switch. Other implementations of the simulation mode switch are possible. Simulation mode switch 316 controls whether API testing should be performed in simulation mode. In the example shown, the simulation mode switch 316 is a selectable button that toggles between on and off. In some embodiments, in simulation mode, a test server is automatically deployed and/or configured according to the processes described herein. For example, the test server is used to generate a simulated mock response (e.g., a "simulated response"). This allows the developer to test the API definition prior to coding the server implementation code of the API. This enables developers to develop the API definition and try API operations/calls without writing business logic code. For example, developers need not write controller logic that calls the API or implement servers with data using the API to see the basic request and response formats of the API. Simulated values are provided for each response object property, mimicking a response that would be generated when the business logic is implemented. As further described herein, the structure of the simulation response conforms to the structure set forth by the definition. In the simulation mode example, the API host and basepath point to the API development environment.

Outside the simulation mode, the response may be generated from user-implemented implementation code or a user-implemented server such as a local host. This allows the API to be tested with user-implemented implementation code or with a user-implemented server. For example, the simulator can be disabled by changing the host and basepath elements to refer to an implemented API. API user application development can take place in parallel with or prior to implementation code/server development. In this regard, a pre-defined test server can be used to simulate API requests and responses.

GUI 300 includes other navigation elements. Left expander 318 and right expander 322 change the relative ratio of documentation panel 370 to definition panel 360. In one embodiment, selecting left expander 318 causes definition panel 360 to be minimized and documentation panel 370 to be maximized such that definition panel 360 is hidden from view and documentation panel 370 consumes the entire display space. Selecting right expander 322 causes definition panel 360 to be maximized and documentation panel 370 to be minimized such that documentation panel 370 is hidden from view and definition panel 360 consumes the entire display space. In another embodiment, the left expander 318 and/or the right expander 322 can be dragged to a desired location to render definition panel 360 and documentation panel 370 in a desired ratio (e.g., 30% of the display shows definition panel 360 and 70% of the display shows documentation panel 370). This can improve legibility and allow a user to focus on a desired panel. Although not shown, in various embodiments, each panel 360, 370 includes scroll bars. For example, scroll bars can include horizontal and/or vertical scroll bars to reveal information that might not fit on a device screen.

Documentation panel 370 shows headings corresponding to various sections of the API definition in definition panel 360. The headings shown in panel 370 include title 330, paths 340, and models 350. Title 330 shows the title of the API. In the example shown, the title of the API is "Bookseller API." The title can be modified by a user, for example, a word or phrase that is descriptive of resources to be exposed by the API.

Paths 340 show resources of the API and operations associated with each resource. For example, "GET" is an operation associated with the "book-title" resource. In the example shown, a simulation of the "GET" operation of the "book-title" resource returns a simulated response from invoking the "GET" operation. The simulation of the "GET" operation is invoked by selecting "Try This Operation" button 342. In some embodiments, triggering the simulation causes execution of at least a portion of processes 400 and/or 500 as further described herein, e.g., with respect to FIGS. 4, 5, and 6A. Cross-reference button 380 shows the location in code corresponding to each resource when selected. For example, selecting cross-reference 380 highlights line 13 in definition panel 360, which is the location in the definition panel corresponding to the "book-title" resource.

Models 350 show defined schema models of the API that can be used elsewhere in the API definition. In the example shown, two schema models describing content names and types have been defined: "BookTitleResponse" and "ErrorResponse." In the API definition shown in panel 360, these models are utilized to define the format of the responses to requests associated with "book-title" resource.

In some embodiments, the examples of user interfaces shown in all of the figures show different aspects of the same embodiment of an API development and testing environment.

FIG. 4 is a flowchart illustrating an embodiment of a process for simulating an API response. The process of FIG. 4 may be at least in part implemented on one or more components of platform 102 shown in FIG. 1A. In some embodiments, process 400 is performed by processor 152 shown in FIG. 1B. In some embodiments, at least a portion of the process of FIG. 4 is included in 202 and/or 204 of FIG. 2. In some embodiments, a developer interacts with the process of FIG. 4 using GUI 300 of FIG. 3.

At 402, a definition of an API identifying an API resource is received. In some embodiments, receiving the definition of the API includes receiving a specification/definition of an API from a developer. For example, the developer may code the API definition using a provided editor/development environment. In some embodiments, the receiving the API definition includes opening a file including the API definition (e.g., the definition is obtained from a storage such as storage 106 shown in FIG. 1A). For example, a developer specified file is loaded into a development/simulation environment. In some embodiments, the API definition is at least in part automatically generated. For example, code is automatically analyzed to generate at least a portion of the API definition. In some embodiments, the API definition includes a Swagger specification. For example, the API definition is a specification of a RESTful API encoded in YAML.

In some embodiments, the API definition specifies the interface for describing, producing, consuming, and visualizing RESTful Web services. The API definition code may identify resources (also referred to as "paths" and "objects"). In various embodiments, the resource is an object with a type, associated data, relationships to other resources, and a set of operations (e.g., methods, functions, etc.) that operate on the resource. For example, the API definition identifies, for each resource, schema of the operations allowed for the resource. Using an example of an API for a bookseller, the API can expose data associated with a product (e.g., a book, a magazine, a CD, etc.), and each resource can have various associated operations. By way of non-limiting example, operations for a book resource include: POST to add data about a (new) book and GET to retrieve data about a book. The manner in which the API exposes the data or service can be defined, refined, and managed by an API developer via the API definition.

In some embodiments, the API resource is one of a plurality of resources defined in the API definition, and at least a portion of the process of FIG. 4 is repeated for each resource of the API definition. For example, each resource is to be individually processed for simulation. In some embodiments, receiving the definition of the resource includes analyzing a received API definition and iteratively analyzing each resource. Analyzing the definition for the API resource may include identifying each operation specified/allowed for the API resource.

At 404, a request and response model is built for each operation of the API resource. For example, the request and response model for an operation is determined based on the received API definition. In some embodiments, the request and response model of an operation identifies information about data that is to be received (e.g., a request) or output (e.g., a response) by the operation of the API resource. For example, for an API operation to be tested, the request and response model includes a request schema for input data required to be provided to the API operation and a response schema for output data to be returned in response to executing the API operation. The schema for a response or a request may identify an expected data name/type/format for input data of an API operation request and an expected data name/type/format for output data of a response to the API request. The model may be built based on analysis of the received definition. For example, each resource has been defined in the API definition, and the request and response model for each operation of the API resource is automatically generated by analysis of the API definition.

At 406, a simulated response is generated for one or more operations of the API resource to be simulated. For example, the simulated response is generated based on the request and response model built for the operation to be simulated. In some embodiments, a respective simulated response is generated for each operation of the API resource. The simulated response may be useful to test the definition of the API operation without needing to actually implement the implementation code (e.g., handler, controller, Node.js code, etc.) of the API operation. For example, the simulated response provides a glimpse into an example response to verify that it includes desired types of data. If the simulated response is not a desired response, the definition of the API operation may be modified. Once a satisfactory simulated response has been achieved, the implementation code may then be developed by the developer knowing that the API definition has been tested for accuracy.

Figure 6B:
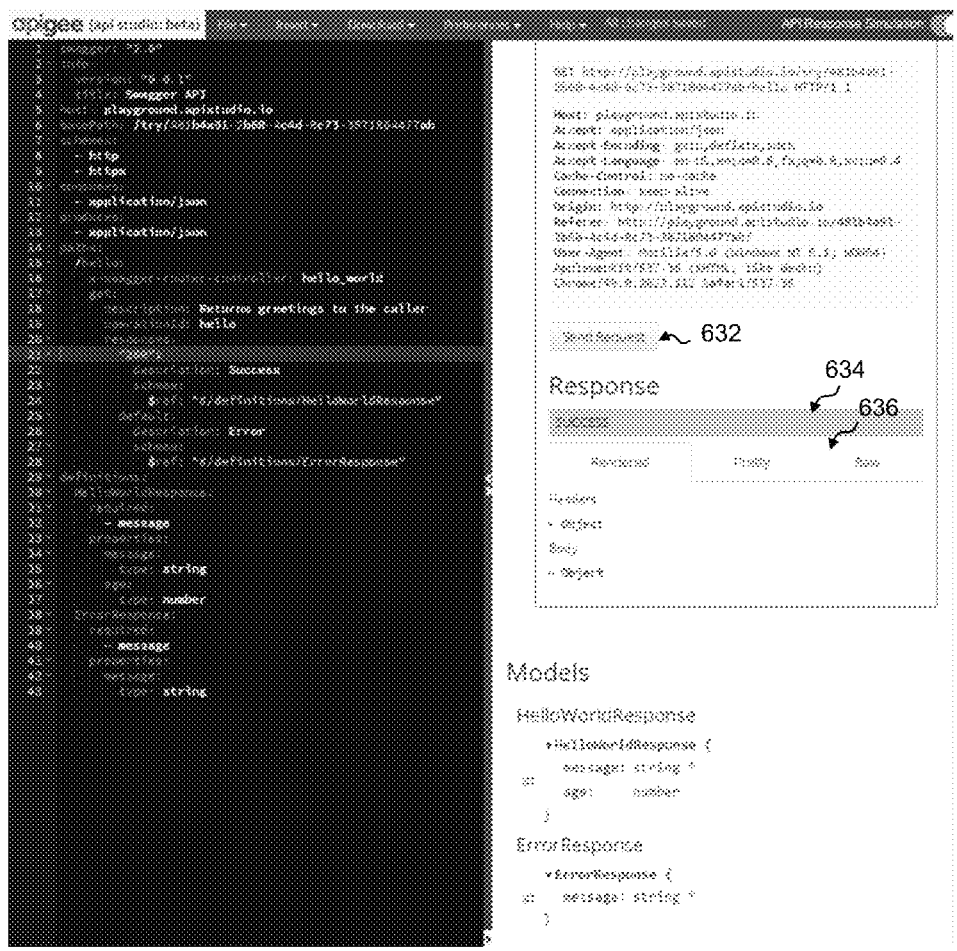
FIG. 6B is an example of a GUI for an API development environment including a simulation function.

The interface utilized by a developer to control simulation of 406 includes the GUIs shown in FIGS. 6A-6E. FIG. 6B is an example of a GUI 630 for an API development environment including a simulation function. GUI 630 shows a state of the API development environment after sending a request as part of a simulation. For example, in response to activation of Send Request button 632, the Response section including status 634 and format options 636 are rendered on GUI 630. The Send Request button 632 is further described herein with respect to element 609 shown in FIG. 6A.

At 408, the simulated response(s) are provided. The simulated response can be provided in a variety of ways. For example, the response can be output for rendering on a display of a device. The response can be rendered on a GUI to aide user development of an API. Example GUIs are shown in FIGS. 3 and 6A-12 and further described herein. FIGS. 6B-6E show examples of outputs to GUIs. For example, the simulated response can be output in a portion of the GUI alongside automatically generated API documentation provided with an interactive API definition editing view.

The Response section of FIG. 6B includes status 634 and format options 636. Status 634 displays information about processing/simulation. As shown, the request in the example of FIG. 6B is successfully processed. Alternatively, status 634 can display information about any errors or other messages related to processing of the request. The format options 636 include input fields accepting user input. In response to the user input, the Response section can be updated to display the response in a desired format as specified by the user. In FIG. 6B, the three options for display include "rendered," "pretty," and "raw." Other options are possible.

Figure 6C:
FIG. 6C is an example of a GUI for an API development environment including a simulation function with an example response.

FIG. 6C is an example of a GUI 650 for an API development environment including a simulation function with an example response. The example response includes a "rendered" version 652 of the response. The rendered version of the response includes information about how the response would be rendered. The rendered version is a reformatted version of the raw response shown in FIG. 6E. The response can include collapsed or minimized information, which can be maximized by selecting corresponding arrows. FIG. 6C shows a maximized version. In the example of FIG. 6C, additional information about header objects and body objects are displayed by selecting the arrow next to "Object." By way of non-limiting example, header object information can include date, server, connection status, powered by information, content length, and content type. Body object information can include message and age.

Figure 6D:
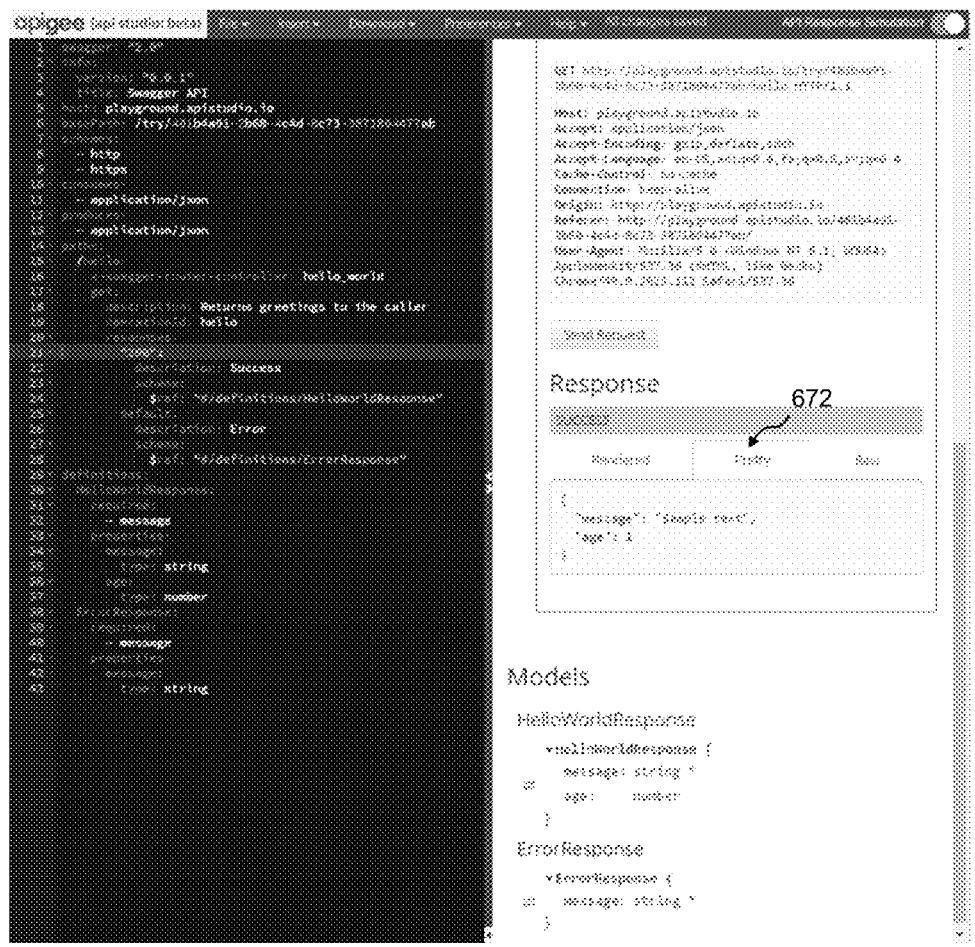
FIG. 6D is an example of a GUI for an API development environment including a simulation function with an example response.

FIG. 6D is an example of a GUI for an API development environment including a simulation function with an example response. The example response includes a "pretty" version 672 of the response. The pretty version of the response includes the body of the response without headers. In the example shown, the body is rendered in a simple and legible manner without including header information. This can help a user to focus on the body of the response.

Figure 6E:
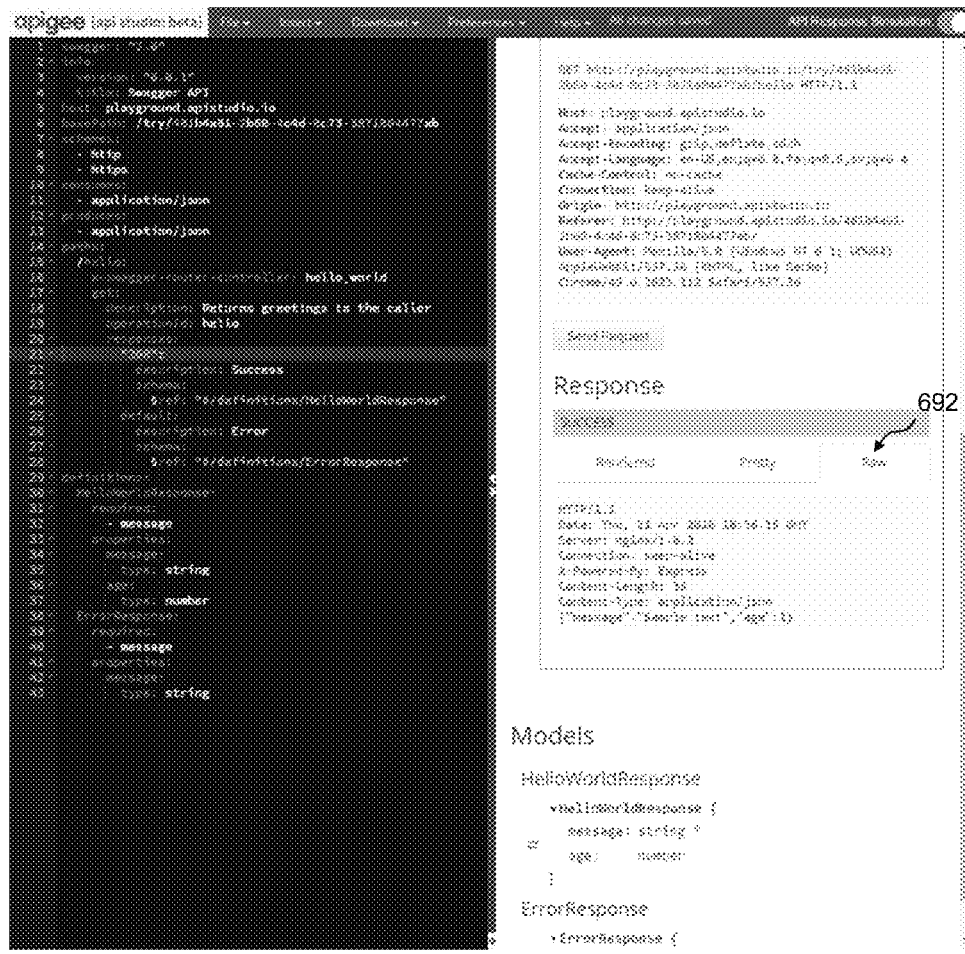
FIG. 6E is an example of a GUI for an API development environment including a simulation function with an example response.

FIG. 6E is an example of a GUI for an API development environment including a simulation function with an example response. The example response includes a "raw" version 692 of the response. The raw version of the response includes information about the header and body of the response. By way of non-limiting example, the raw information includes HTTP version, date, server, connection status, powered by information, content length, content type, and body message content.

FIG. 5 is a flowchart illustrating an embodiment of a process for generating a simulated response to an operation of an API resource. The process of FIG. 5 may be at least in part implemented on one or more components of platform 102 shown in FIG. 1A. In some embodiments, at least a portion of the process of FIG. 5 is included in 204 of FIG. 2. In some embodiments, at least a portion of the process of FIG. 5 is included in 406 of FIG. 4.

At 502, request properties of an operation to be simulated are determined. In some embodiments, a request and response model for the operation was built in 404 of FIG. 4. In some embodiments, the request properties define one or more protocols used for the input or request for the operation. The operation can be an operation associated with an API resource. At least some of the properties can be automatically determined, randomly determined, received as user input (e.g., drop-down menu options, input to text boxes), etc. In some embodiments, the properties are based on the request and response model. In some embodiments, request properties of the operation based on an API definition define the operation.

The request properties may be user-provided or system-generated. For example, the request property is provided via an input text field. In some embodiments, the request property input is provided via a GUI. An example of the interface utilized by a developer to specify the request properties includes GUI 600 shown in FIG. 6A. Using the example of FIG. 6A, the input can be provided by a developer via drop-down menus 604, 606. Other ways of inputting data are also possible. As another example, the request property can be automatically identified. For example, the processor identifies relevant lines of code (e.g., in the API definition) corresponding to the operation and associated defined response schema. For example, the request properties are expected to conform to a schema set forth in the API definition.

In some embodiments, after determining the properties of the request/input, a preview of the request is generated. For example, the preview can be rendered on a section of a GUI associated with the operation (e.g., in an automatically generated API documentation section). In various embodiments, the preview enables a user to confirm and/or correct any property of the request. The preview can also provide dynamic feedback regarding development. Options for protocols can be displayed in a drop-down menu, for example as shown in FIG. 6A. As another example as shown in FIG. 6A, the request property provided by the user via drop-down menu 604 is "http," which is previewed, allowing a user to confirm that "http" is the user-defined protocol to be used to issue the request.

FIG. 6A shows an example of a GUI for an API development and testing environment. API response simulation can be triggered by selecting a corresponding element in the GUI. For example, selecting "Try This Operation" 342 in FIG. 3 triggers the simulation of a corresponding operation of an API resource. FIG. 6A shows a state of the GUI after the simulation mode is initiated, e.g., in response to selecting "Try This Operation."

The GUI shown in FIG. 6A includes input fields accepting user input regarding the request 602 and response 601. The input fields can be rendered according to a retrieved API definition. In the example shown, the request is expected to be made using request property specified in scheme drop down selection box 604 and accept drop down selection box 606. A developer can provide user-defined request properties by selecting options from a drop-down menu, inputting text, and the like. In some embodiments, scheme drop down selection box 604 identifies the protocol to be used to make the operation request (e.g., HTTP, HTTPS, etc.). Examples of options for the accept drop down selection box 606 include application/JSON, XML, and other administrator-identified content types. In some embodiments, options provided for user-selection are those that are included in the retrieved API definition.

The documentation panel on the right side also displays request details 608. Request details 608 show headers of a simulated request. The example shown in FIG. 6A includes information about the command (GET), a host, acceptance, encoding protocol, language of the acceptance, cache control, connection parameters, origin, referrer, and user-agent.

The documentation panel also displays Send Request button 609. Selecting the Send Request button 609 invokes generation of a simulated response using the specified request properties. In some embodiments, a test server that has been automatically launched and configured to handle the response simulation of the API is provided with the request and the simulated response is received.

In some embodiments, when the simulation mode has been disabled, the server that is to receive the request is a user-implemented server executing actual implementation code. For example, whether to use a test server for simulation can be selected via a simulation mode selector 316 as described with respect to FIG. 3.

Returning to FIG. 5, at 504, a test server is utilized to simulate execution of the operation using the determined properties. In some embodiments, simulating the execution includes providing a simulated response to the operation. For example, before the implementation code/controllers of the API of the operation have been fully developed, the definition of the operation is allowed to be tested by simulating the implementation code/controllers to return a mock simulated response for testing purposes. In some embodiments, by allowing the API to be simulated using a test server that accepts and responds to API calls before completion of the API deployment, client applications that will utilize the API are allowed to be developed in parallel with the API implementation development. For example, client applications being developed can call the API and use the simulated response as an example response to aid in the development of the client applications.

In some embodiments, if the test server has not been previously deployed, a test server is deployed to host a simulated version of the API of the operation. If a test server has already been deployed, the test server is configured to host the simulated version of the API of the operation. The test server may be deployed/configured according to specifiable parameters such as parameters of the operation. For example, the test server is deployed/configured to accept certain types of requests, use certain protocols, and the like.

In some embodiments, simulating the execution of the operation includes identifying the types, formats, and labels of data expected to be outputted by the operation and determining a simulated output data for each data to be outputted. The expected properties of the data to be outputted may be determined based on a response model determined for the operation in 404 of FIG. 4. For example, a template for the simulated output is generated based on the response model of the operation, where the response model is determined based on the API definition of the operation. Values that fit the type and format of the data components of the expected response are identified and included in the template and provided as the simulated response.

In some embodiments, the simulated response is generated in response to an indication to simulate the response to the operation. For example, in response to a press of a user interface button associated with the operation, the simulated response is generated. The interface button may be provided in an API development environment interface (e.g., interface 300 of FIG. 3) and the simulated response may also be provided via the API development environment interface. In some embodiments, one or more operation request options (e.g., request protocol scheme, etc.) may be specified for the simulation of the response. For example, a developer is able to select the desired request options from among a plurality of available options.

In some embodiments, the simulated response includes a default and/or random data selected to match the type of response data expected to be included in the response as specified by the definition of the operation. For example, a response to an operation has been defined to include a string type value labeled as a "message" and an integer type value labeled as an "age" and the following is provided as a simulated response to the operation: {"message": "Sample text", "age": 1}. The value "Sample text" is a default simulated value for any string type value and the value "1" is a default simulated value for any integer type value. The actual response to this example operation may be: {"message": "Hello, world!", "age": 21}, and the default value provided mock values that match the data type expected to be included in the response. In some embodiments, the default simulated values for one or more data types are configurable. For example, simulation mode resource operation controllers may be coded/specified by a developer to allow specific default values to be returned during simulation. In some embodiments, the simulated value included in the simulated response is at least in part randomly determined. For example, among eligible values that match the type of data to be returned, the value to be returned is randomly selected.

At 506, a simulation state is stored. For example, a simulated response to the simulated execution is stored in storage 106 shown in FIG. 1A. By storing the simulation state, the simulation/testing state can referenced later. Additionally, multiple developers may access the simulation state, and the stored simulation state allows the developers to collaborate to develop the API. For example, a link such as a universal resource identifier (URI) linked to a simulated state/response of the API development environment enables a developer to access the API in the associated state. That is, a link to the development environment in a saved state is accessible by users with knowledge of the URI, allowing for easy collaboration.

API development projects may be imported and/or exported. The development environment provides options to create a new project, load a sample project, import a Swagger project, load a project into a Swagger UI, and the like. The development environment provides options to export a project to a file, to a Node.js project, and the like.

Figure 7:
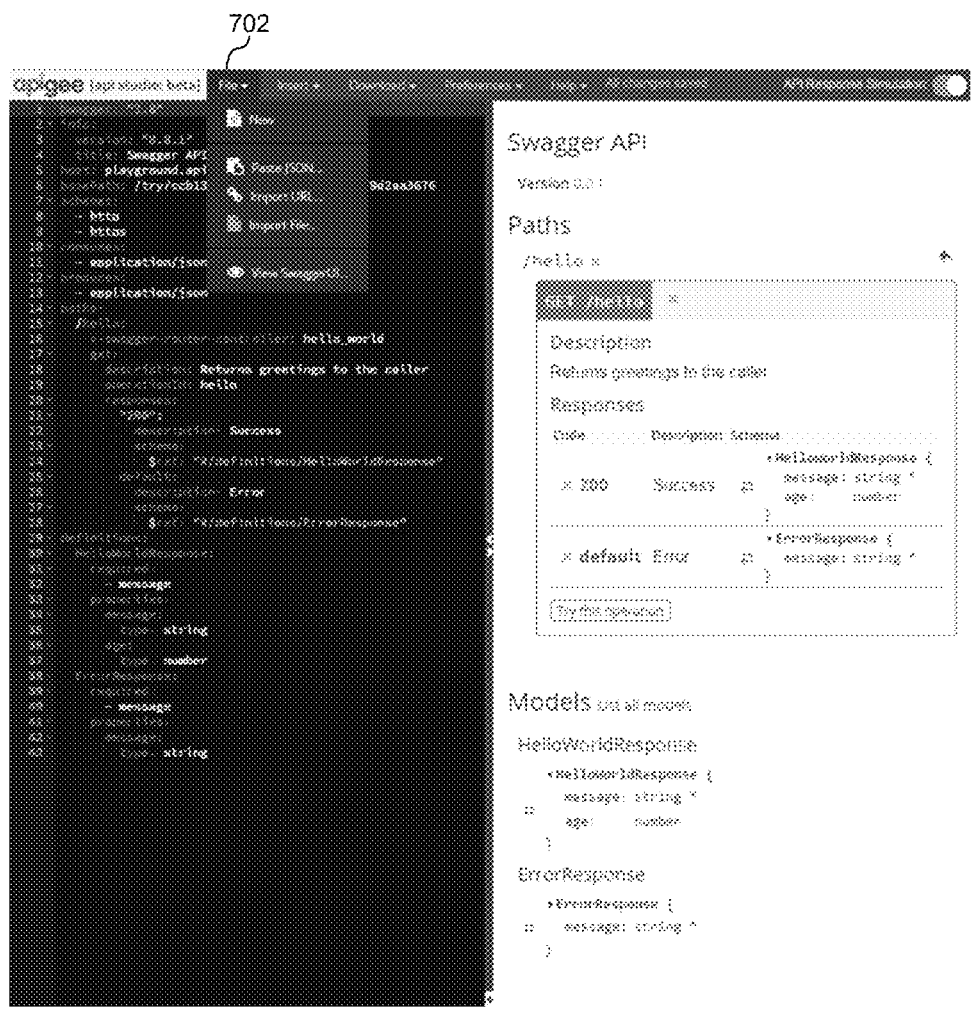
FIG. 7 is an example of a GUI for an API development environment including a file menu.

FIG. 7 is an example of a GUI for an API development environment including a file menu. In some embodiments, the interface shown in FIG. 7 is utilized in 202 of FIG. 2 to specify an API definition. File menu 702 provides options to create or import an API. The file menu 702 can be displayed in response to a trigger such as user input (mouse click, finger tap, etc. of a relevant portion of the GUI). In the example shown, options associated with the file menu 702 are presented in a drop-down menu. Other ways of displaying the information are possible.

The file menu includes actions for an API development environment. In the example shown, file options include "New," "Paste JSON," "Import URL," "Import File," and "View SwaggerUI . . . ," which are functions that can be performed in the API development environment. Selecting "New" creates a new project, which can be populated with default values. For example, the new project includes a new base path with default API values. Selecting "Paste JSON" allows a user to input JSON information such as JSON code. In some embodiments, as Swagger JSON is pasted into the development environment, the Swagger JSON is validated. For example, a pop-up window can be rendered in the GUI (not shown) to receive user input. Selecting "Import URL" allows a user to import information identified by a URL. In some embodiments, the imported information is Swagger JSON and validated as it is imported. For example, a pop-up window can be rendered in the GUI (not shown) to receive user input. In some embodiments, "Import URL" can provide a user-selectable option of whether to use CORS proxy. Selecting "Import File" allows a user to import a file into the API development environment. In some embodiments, Swagger JSON is identified and extracted from the file and validated as it is imported. For example, a pop-up window can be rendered in the GUI (not shown) to receive user input. In some embodiments, "Import URL" can accept files of various formats including YAML and JSON. Selecting "View SwaggerUI . . . " allows a user to load the API project of the development environment in SwaggerUI.

Although not shown, in some embodiments, the file menu includes an "open example" option, which opens a sample Swagger document in the editor. In the example of FIG. 7, the sample Swagger document is already loaded in the editor.

Figure 8:
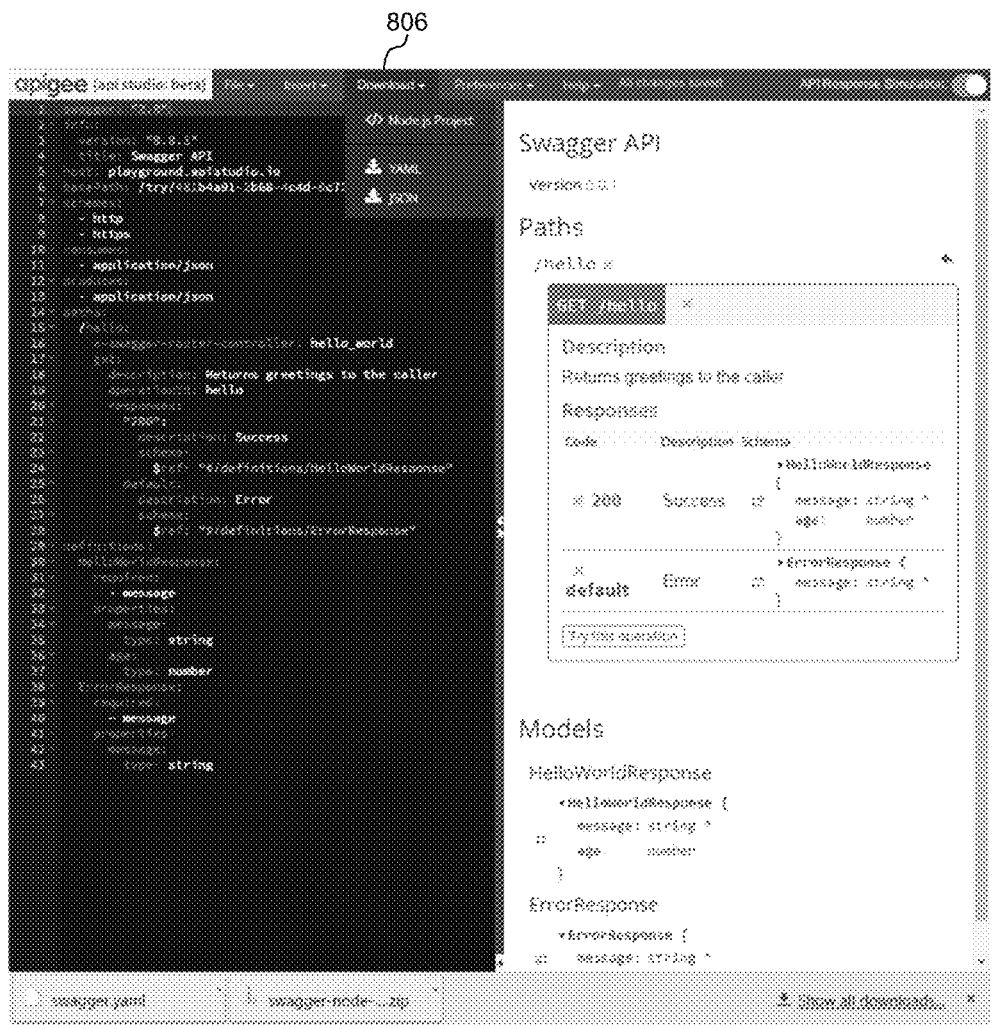
FIG. 8 is an example of a GUI for an API development environment including a download menu.

FIG. 8 is an example of a GUI for an API development environment including a download menu. In some embodiments, the interface shown in FIG. 8 is utilized in 206 of FIG. 2 to download a deployment template of an API development project. Download menu 806 can be displayed in response to a trigger such as user input (mouse click, finger tap, etc. of a relevant portion of the GUI). In the example shown, options associated with the download menu 806 are presented in a drop-down menu. Other ways of displaying the information are possible.

The download menu includes actions for the API development environment. A current state of the API development environment can be downloaded in various formats. In the example shown, download options include "</> Node.js Project," "YAML," and "JSON." Selecting "</> Node.js Project" causes a current state of the API development environment to be downloaded as a Node.js Swagger project. Having the Node.js file allows a user to run and test the project locally, implement path endpoint logic in Node.js controller files, deploy the project to a Cloud container that supports Node.js, and the like. Selecting "YAML" causes a current state of the API development environment to be downloaded in YAML format. Selecting "JSON" causes a current state of the API development environment to be downloaded in JSON format.

Figure 9A:
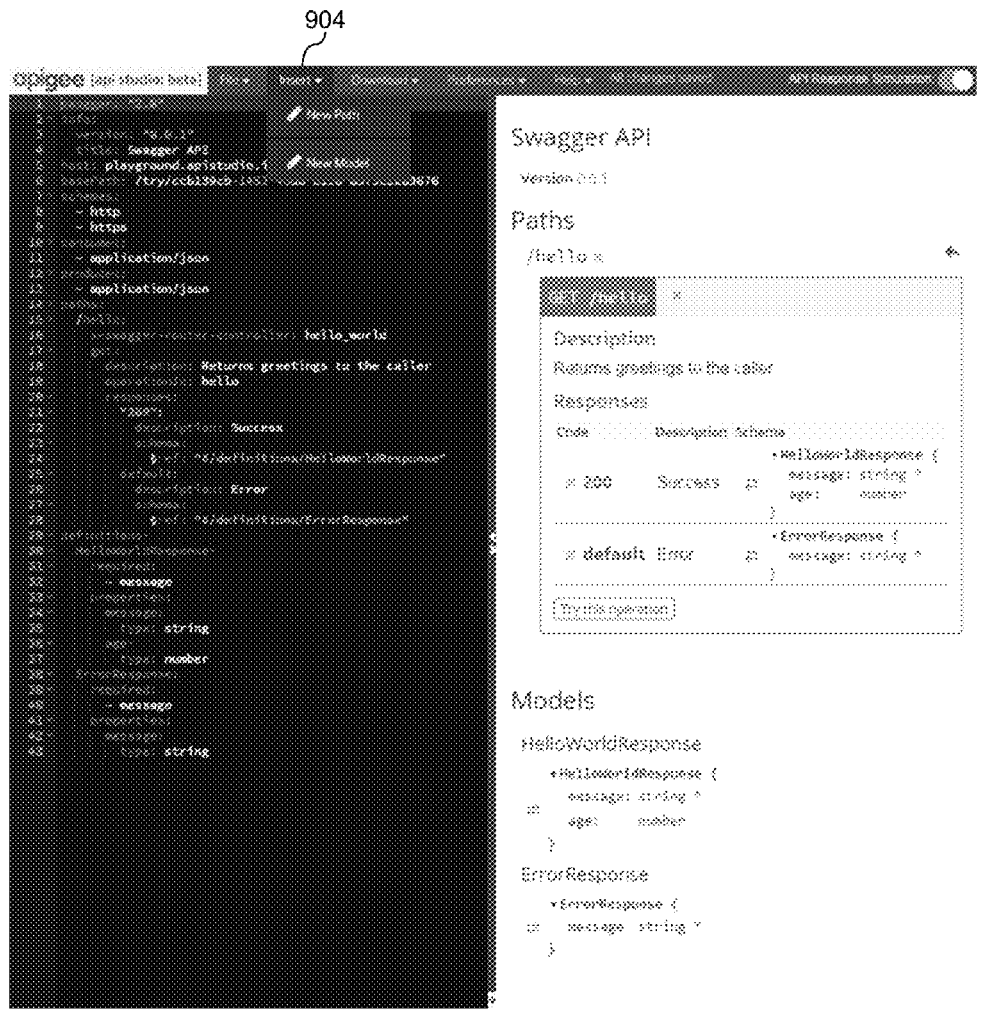
FIG. 9A is an example of a GUI for an API development environment including an insert menu.

FIG. 9A is an example of a GUI for an API development environment including an insert menu. In some embodiments, the interface shown in FIG. 9A is utilized in 202 of FIG. 2 to specify an API definition. Insert menu 904 can be displayed in response to a trigger such as user input (e.g., mouse click, finger tap, etc. of a relevant portion of the GUI). In the example shown, options associated with the insert menu 904 are presented in a drop-down menu. Other ways of displaying the information are possible.

The insert menu includes actions for the API development environment. In the example shown, insert options include "New Path" and "New Model." Selecting "New Path" allows one or more paths to be added to a current project in the API development environment. For example, a pop-up window is rendered in the GUI to receive user input as shown in FIG. 9B.

Figure 9B:
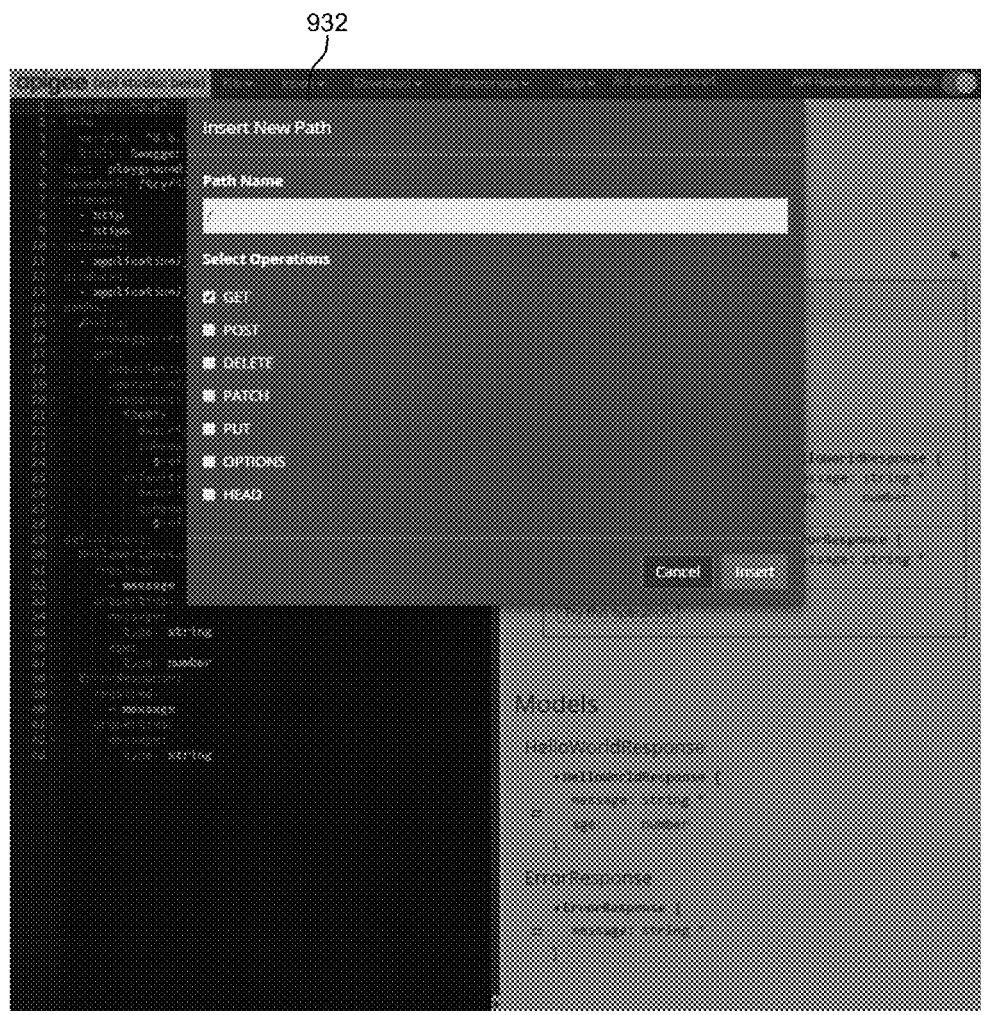
FIG. 9B is an example of a GUI for an API development environment including a new path panel.

FIG. 9B is an example of a GUI for an API development environment including a new path panel. In some embodiments, the interface shown in FIG. 9B is utilized in 202 of FIG. 2 to specify an API definition. In the example shown, new path panel 932 includes an input field accepting a path name. The path name can be selected or defined by the user, for example, a descriptive path name. New path panel 932 also includes selectable pre-defined operations such as GET, POST, DELETE, PATCH, PUT, OPTIONS, and HEAD. Selecting a path adds the path to the API development environment. To later remove a path, the corresponding path in the documentation panel can be selected. For example, an "X" next to the corresponding path deletes the path.

Figure 9C:
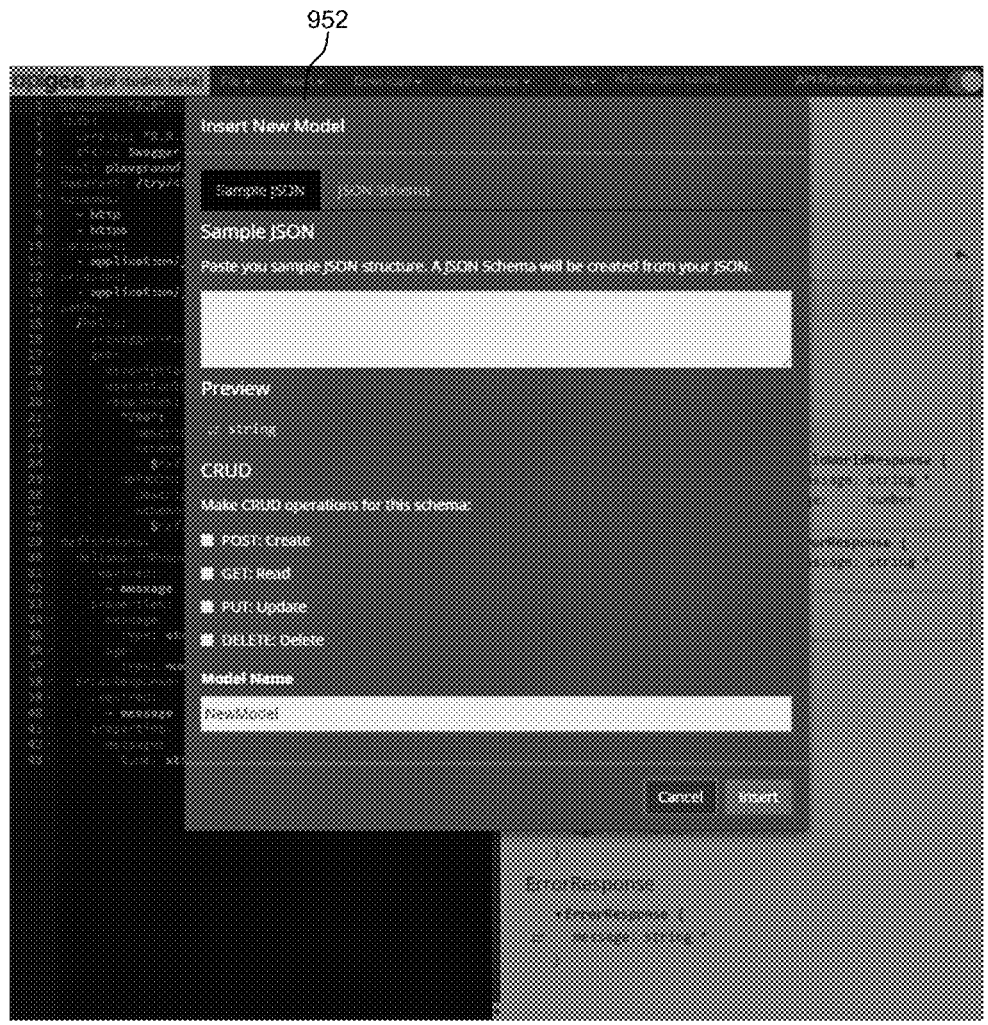
FIG. 9C is an example of a GUI for an API development environment including a new model panel.

FIG. 9C is an example of a GUI for an API development environment including a new model panel. In some embodiments, the interface shown in FIG. 9C is utilized in 202 of FIG. 2 to specify an API definition. In the example shown, new model panel 952 includes an input field accepting JSON. The input field can accept input as Sample JSON or JSON Schema. In some embodiments, the new model panel 952 shows a preview of the JSON. In some embodiments, new model panel 952 provides options for CRUD operations for the schema such as POST, GET, PUT, and DELETE. In some embodiments, new model panel 952 includes an input field accepting a user-definable name for the model.

Figure 10A:
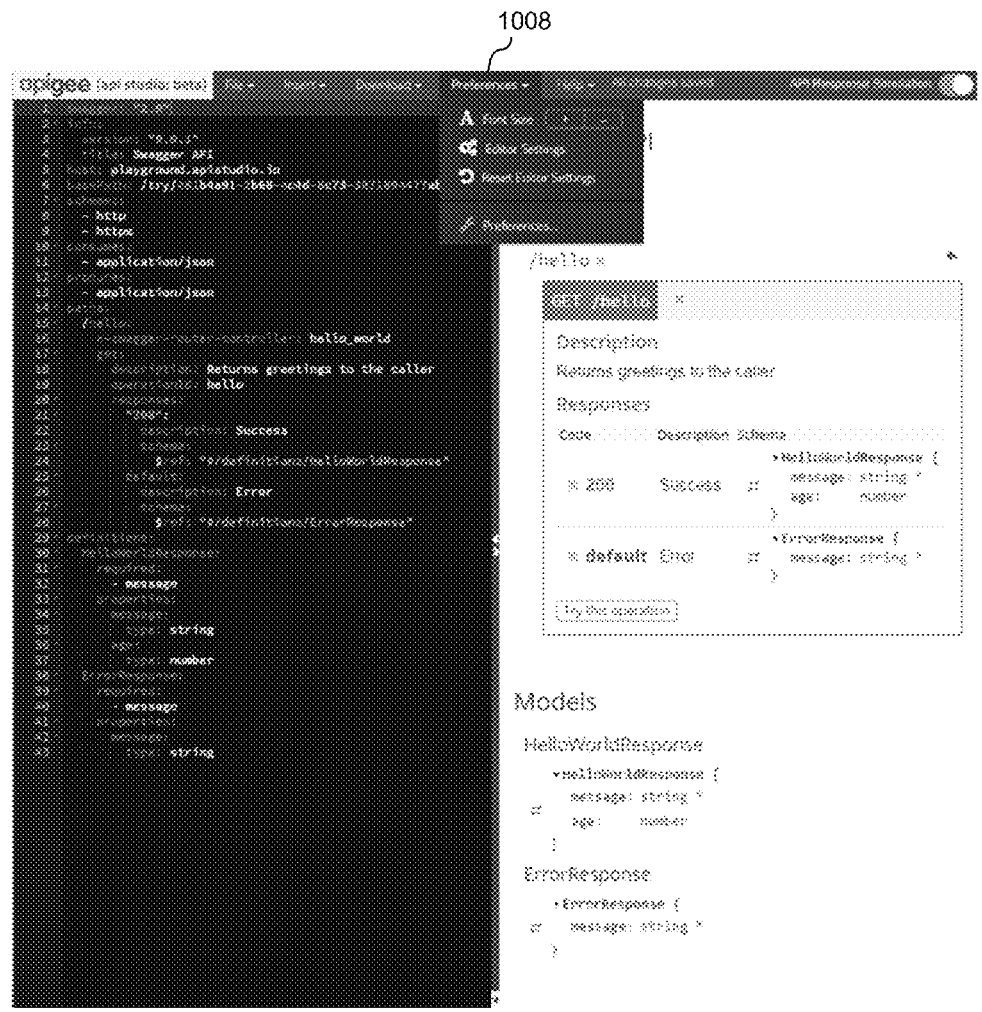
FIG. 10A is an example of a GUI for an API development environment including a preferences menu.

FIG. 10A is an example of a GUI for an API development environment including a preferences menu. Preferences menu 1008 can be displayed in response to a trigger such as user input (mouse click, finger tap, etc. of a relevant portion of the GUI). In the example shown, options associated with the preferences menu 1008 are presented in a drop-down menu. Other ways of displaying the information are possible.

Figure 10B:
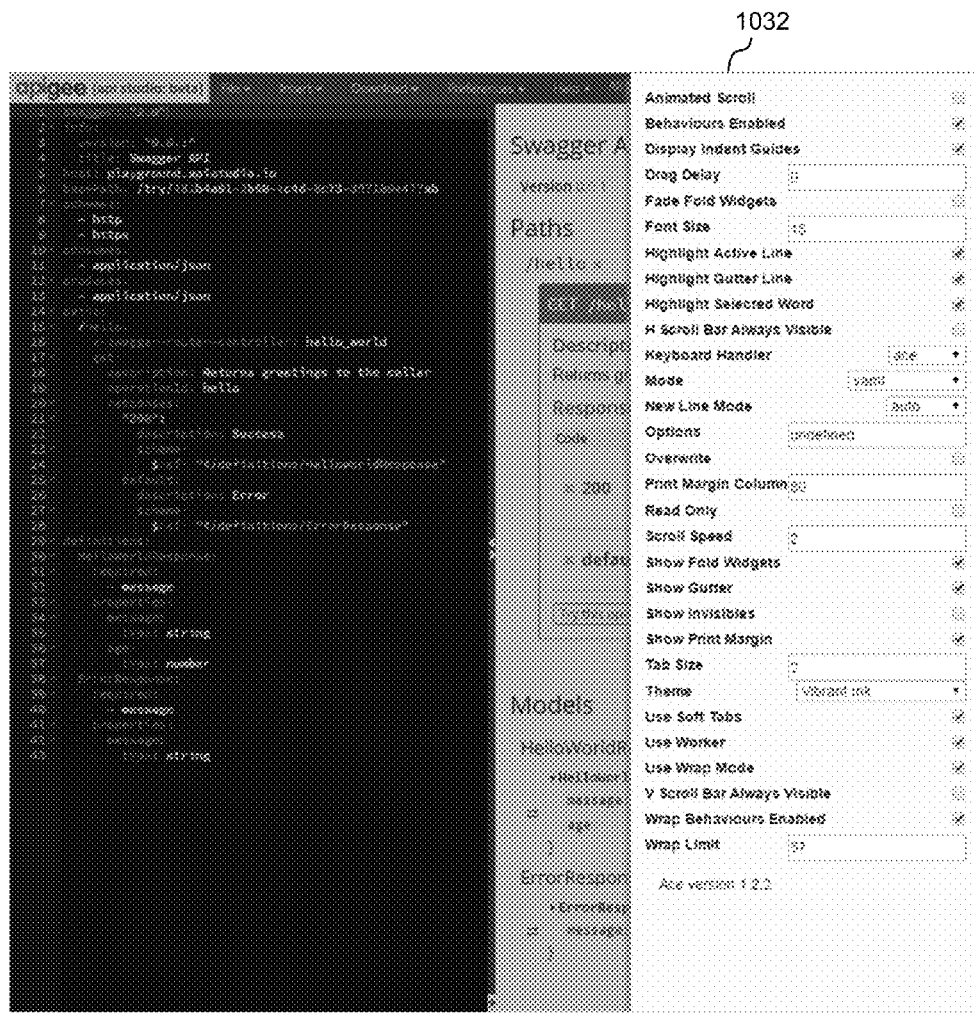
FIG. 10B is an example of a GUI for an API development environment including an editor settings panel.

The preferences menu includes actions for the API development environment. In the example shown, preferences options include font size adjustment, editor settings, reset editor settings, and editor preferences. The font size adjustment can include controls for increasing or decreasing font size for the entire GUI, the definition panel, or the documentation panel. Selecting "Editor Settings" allows a user to customize the API development environment. For example, a pop-up window can be rendered in the GUI to receive user input as shown in FIG. 10B. Selecting "Reset Editor Settings" causes the API development environment to be rendered according to default specifications. For example, the API development environment can be rendered according to user- or administrator-specified parameters. Selecting "Preferences . . . " allows a user to customize the API development environment. For example, a pop-up window can be rendered in the GUI to receive user input as shown in FIG. 10C.

FIG. 10B is an example of a GUI for an API development environment including an editor settings panel. Editor settings panel 1032 receives input from a user and adjusts the definition panel and/or the documentation panel according to the input. FIG. 10B shows example settings. Other settings are possible.

Figure 10C:
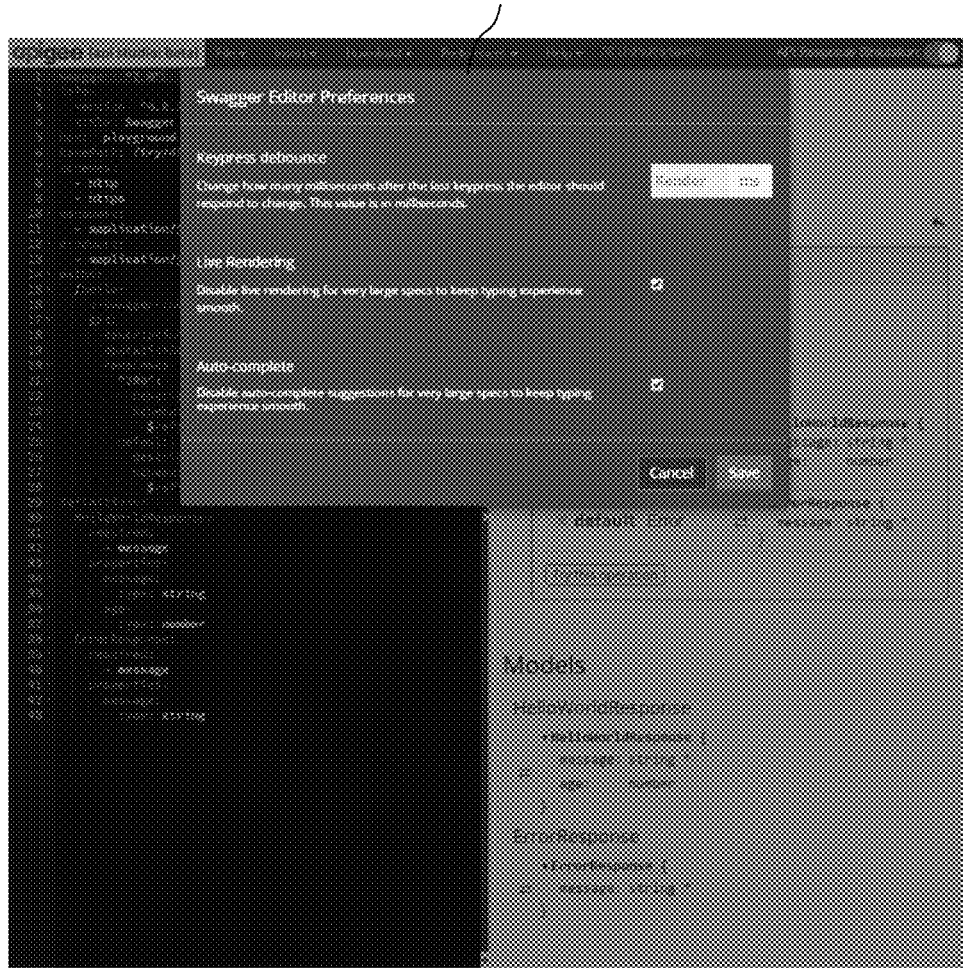
FIG. 10C is an example of a GUI for an API development environment including a preferences panel.

FIG. 10C is an example of a GUI for an API development environment including a preferences panel. Preferences panel 1052 receives input from a user and adjusts the definition panel and/or the documentation panel according to the input. FIG. 10C shows example settings related to Keypress, Live Rendering, and Auto-complete. For example, live rendering provides immediate feedback in the other panel if one of the definition panel or the documentation panel is updated. Live rendering can be disabled such that immediate feedback is not provided. In some instances, if live rendering is disabled, large specs can be handled with a smoother experience. If processing resources are limited, live rendering can be disabled to improve user experience. Other settings are possible.

Figure 11:
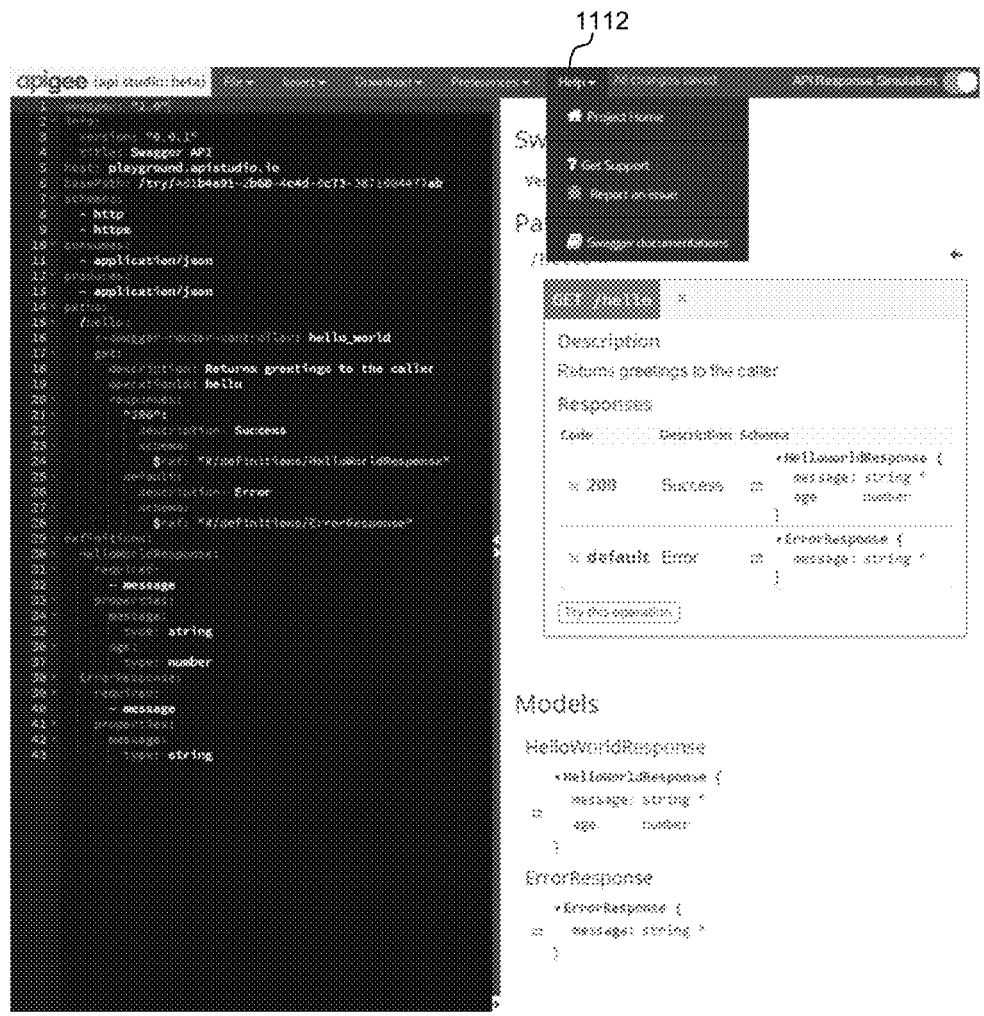
FIG. 11 is an example of a GUI for an API development environment including a help menu.

FIG. 11 is an example of a GUI for an API development environment including a help menu. Help menu 1112 can be displayed in response to a trigger such as user input (mouse click, finger tap, etc. of a relevant portion of the GUI). In the example shown, options associated with the help menu 1112 are presented in a drop-down menu. Other ways of displaying the information are possible.

The help menu includes actions for the API development environment. In the example shown, help options include "Project Home," "Get Support," "Report an issue," and "Swagger documentations." Selecting "Project Home" directs a user to a landing page for the API development environment. For example, selecting "Project Home" causes a Web page to load in a new window. The Web page can include content such as announcements relevant to the API development environment, a link to initiate a new API development environment, and other types of content. Selecting "Get Support" directs a user to a landing page for help related to the API development environment. For example, selecting "Get Support" causes a Web page to load in a new window. The Web page can be a forum for sharing information about the API development environment. Selecting "Report an issue" directs a user to a landing page for reporting issues. For example, selecting "Report an issue" causes a Web page to load in a new window. The Web page receives user input and redirects the user input to a support team, administrator, and the like. Selecting "Swagger documentations" allows a user to view documentation regarding the API development environment. For example, a Web page of general SwaggerUI documentation is loaded in a new window.

Figure 12:
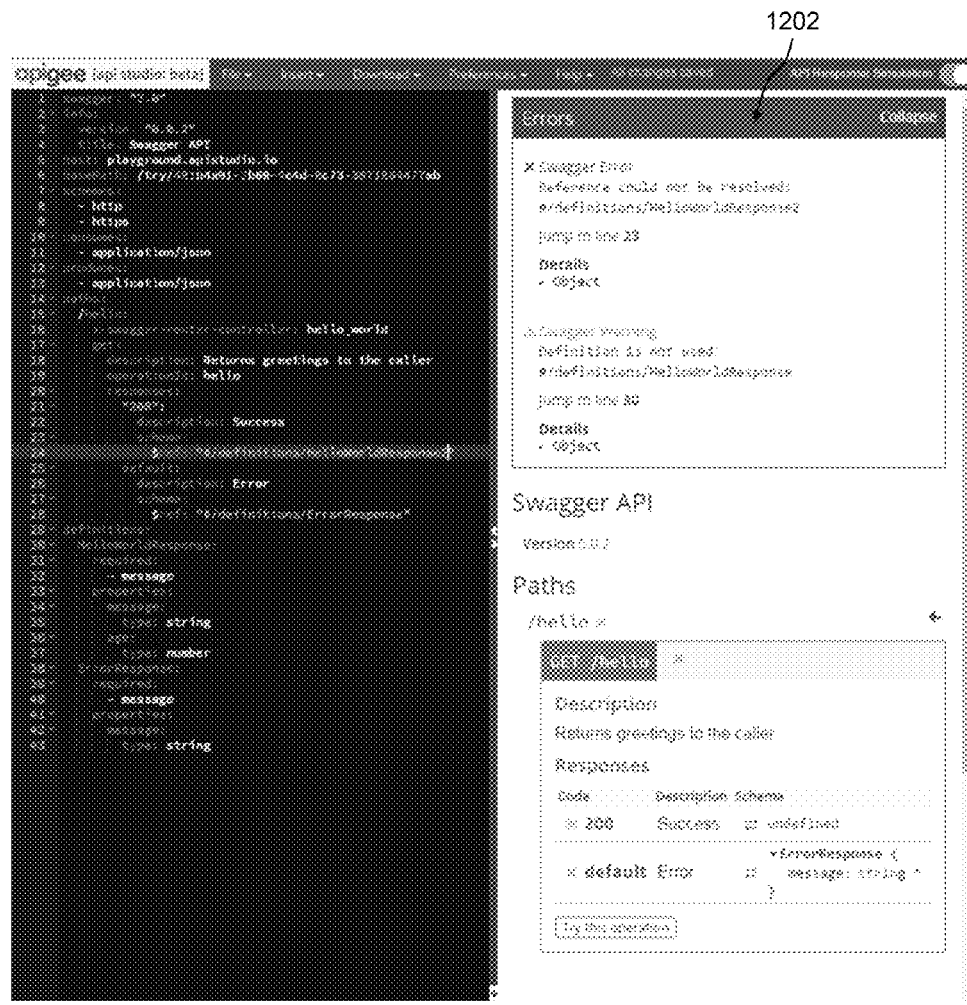
FIG. 12 is an example of a GUI for an API development environment including an error display.

FIG. 12 is an example of a GUI for an API development environment including an error display. In some embodiments, the interface shown in FIG. 12 is utilized in 202 of FIG. 2 to indicate an error detected in an API definition. GUI 1200 includes error message 1202. The error message includes details regarding the error and highlights corresponding line(s) of code in the API definition. In the example shown in FIG. 12, the error is triggered by an inconsistency between scheme (definition) name in two places of the code. In the response, "HelloWorldResponse2" (line 24) is used, but "HelloWorldResponse" is used in definition section beginning in line 29. The error message 1202 includes probable locations for the error, allowing a user to select "Jump to Line" to debug the error.

The techniques of the present disclosure have been described using the example of API development. They also find application in other contexts, for example, design of various modules, coding, and testing that relies on or benefits from using a mock server, collaborative space, etc.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method of simulating an application programming interface (API), comprising:
   receiving a definition for an API resource that defines an expected data type of an input into an operation of the API resource and a data type of an output from the operation of the API resource in response to input of the expected data type;
   building a request and response model for an operation of the API resource using the received definition for the API resource;
   receiving a request to enable a simulation mode for the API resource;
   receiving, from a client application and after the API resource is placed in the simulation mode in response to the request to enable the simulation mode for the API resource, an API call request for the operation of the API resource, where the API call request includes particular input for the operation of the API resource;
   determining based at least on the request and response model that the particular input included in the API call that was received matches the expected data type of an input into the operation of the API resource as defined in the definition for the API resource that was received; and
   in response to determining based at least on the request and response model that the particular input included in the API call that was received matches the expected data type of an input into the operation of the API resource as defined in the definition for the API resource that was received, providing to the client application in response to the request and based at least on the request and response model, a simulated response that matches the data type of the output from the operation of the API resource as defined in the definition;
   receiving a request to disable the simulation mode for the API resource;
   receiving, from the client application and after receiving the request to disable the simulation mode for the API resource, a second API call request for the operation of the API resource; and
   providing the client application a response according to a backend implementation code for the API resource instead of a simulated response.

2. The method of claim 1, wherein the generating the simulated response includes interactively testing the operation of the API resource in real time.

3. The method of claim 1, further comprising:
   dynamically updating a portion of a graphical user interface corresponding to the simulated response in response to modifications to the definition of the API resource in another portion of the graphical user interface.

4. The method of claim 1, further comprising:
   providing a selectable option for operating in the simulation mode; and
   responsive to a command to operate in the simulation mode, configuring a test server to at least partially generate the simulated response.

5. The method of claim 1, wherein the request and response model is built for each defined operation of the API resource using the received definition.

6. The method of claim 1, wherein an interface of the API development environment provides a visualization of the definition of the API resource and the simulated response.

7. The method of claim 1, further comprising:
   providing access to the API development environment via a shareable uniform resource identifier (URI).

8. The method of claim 1, further comprising:
   receiving a user-identified parameter for a request of the operation.

9. The method of claim 1, wherein the building the request and response model includes identifying a defined schema model utilized in the definition of the API resource.

10. The method of claim 1, wherein the building the request and response model includes identifying a data type for an expected response to the operation.

11. The method of claim 1, wherein the generating the simulated response for the operation includes identifying a default value matching a defined data type of an expected response to the operation.

12. The method of claim 11, wherein the default value is user defined.

13. The method of claim 1, wherein the definition for the API resource has been defined using Swagger.

14. The method of claim 1, wherein the definition for the API resource is a definition of a RESTful API.

15. A system for simulating an application programming interface (API), comprising:
   one or more computers and one or more storage devices storing instructions that are operable, when executed by the one or more computers, to cause the one or more computers to perform operations comprising:

receiving a definition for an API resource that defines an expected data type of an input into an operation of the API resource and a data type of an output from the operation of the API resource in response to input of the expected data type;

building a request and response model for an operation of the API resource using the received definition for the API resource;

receiving a request to enable a simulation mode for the API resource;

receiving, from a client application and after the API resource is placed in the simulation mode in response to the request to enable the simulation mode for the API resource, an API call request for the operation of the API resource, where the API call request includes particular input for the operation of the API resource;

determining based at least on the request and response model that the particular input included in the API call that was received matches the expected data type of an input into the operation of the API resource as defined in the definition for the API resource that was received; and in response to determining based at least on the request and response model that the particular input included in the API call that was received matches the expected data type of an input into the operation of the API resource as defined in the definition for the API resource that was received, providing to the client application in response to the request and based at least on the request and response model, a simulated response that matches the data type of the output from the operation of the API resource as defined in the definition;

receiving a request to disable the simulation mode for the API resource;

receiving, from the client application and after receiving the request to disable the simulation mode for the API resource, a second API call request for the operation of the API resource; and providing the client application a response according to a backend implementation code for the API resource instead of a simulated response.

16. A non-transitory computer-readable medium storing software for simulating an application programming interface (API) comprising instructions executable by one or more computers which, upon such execution, cause the one or more computers to perform operations comprising:

receiving a definition for an API resource that defines an expected data type of an input into an operation of the API resource and a data type of an output from the operation of the API resource in response to input of the expected data type;

building a request and response model for an operation of the API resource using the received definition for the API resource;

receiving a request to enable a simulation mode for the API resource;

receiving, from a client application and after the API resource is placed in the simulation mode in response to the request to enable the simulation mode for the API resource, an API call request for the operation of the API resource, where the API call request includes particular input for the operation of the API resource;

determining based at least on the request and response model that the particular input included in the API call that was received matches the expected data type of an input into the operation of the API resource as defined in the definition for the API resource that was received; and in response to determining based at least on the request and response model that the particular input included in the API call that was received matches the expected data type of an input into the operation of the API resource as defined in the definition for the API resource that was received, providing to the client application in response to the request and based at least on the request and response model, a simulated response that matches the data type of the output from the operation of the API resource as defined in the definition;

receiving a request to disable the simulation mode for the API resource;

receiving, from the client application and after receiving the request to disable the simulation mode for the API resource a second API call request for the operation of the API resource; and providing the client application a response according to a backend implementation code for the API resource instead of a simulated response.

17. The method of claim 1, wherein providing to the client application in response to the request and based at least on the request and response model, a simulated response that matches the data type of the output from the operation of the API resource as defined in the definition comprises:

randomly selecting a default value of the data type of the output from among a set of multiple user pre-defined default values.

18. The method of claim 1, wherein providing to the client application in response to the request and based at least on the request and response model, a simulated response that matches the data type of the output from the operation of the API resource as defined in the definition comprises:

providing a particular user pre-defined value that is used for all occurrences of a particular data type included in the data type of the output from the operation.

19. The method of claim 1, wherein the data type of the output from the operation includes a string type and integer type, wherein the built and request model describes providing a particular user-pre-defined string for all occurrences of string type in simulated output for the operation and providing a particular user-pre-defined integer for all occurrences of integer type in simulated output for the operation.

* * * * *